United States Patent
Lee et al.

(10) Patent No.: US 9,881,308 B2
(45) Date of Patent: Jan. 30, 2018

(54) METHOD AND SYSTEM TO FACILITATE AN ONLINE PROMOTION RELATING TO A NETWORK-BASED MARKETPLACE

(75) Inventors: Stacy A. Lee, San Jose, CA (US); Justin Christopher Early, San Jose, CA (US); Kevin McSpadden, San Francisco, CA (US); Greg Pedone, San Jose, CA (US)

(73) Assignee: eBay Inc., San Jose, CA (US)

( * ) Notice: Subject to any disclaimer, the term of this patent is extended or adjusted under 35 U.S.C. 154(b) by 2801 days.

(21) Appl. No.: 10/412,017

(22) Filed: Apr. 11, 2003

(65) Prior Publication Data
US 2004/0204967 A1 Oct. 14, 2004

(51) Int. Cl.
*G06Q 30/00* (2012.01)
*G06Q 30/02* (2012.01)
*G06Q 40/08* (2012.01)

(52) U.S. Cl.
CPC ............ *G06Q 30/02* (2013.01); *G06Q 40/08* (2013.01)

(58) Field of Classification Search
CPC ...................................................... G06Q 30/02
USPC ............................................... 705/14.1, 14.4
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 4/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,833,607 A | 5/1989 | Dethloff | |
| 4,864,516 A | 9/1989 | Gaither et al. | |
| 4,903,201 A | 2/1990 | Wagner | |
| 4,949,256 A | 8/1990 | Humble | |
| 4,982,346 A | 1/1991 | Girouard et al. | |
| 5,056,019 A | 10/1991 | Schultz et al. | |
| 5,063,507 A | 11/1991 | Lindsey et al. | |
| 5,076,433 A | 12/1991 | Howes | |
| 5,077,665 A | 12/1991 | Silverman et al. | |
| 5,101,353 A | 3/1992 | Lupien | |

(Continued)

FOREIGN PATENT DOCUMENTS

| WO | WO-9809447 A3 | 3/1998 |
|---|---|---|
| WO | WO-0129750 A1 | 4/2001 |
| WO | WO-0137171 A1 | 5/2001 |

OTHER PUBLICATIONS

"@wards online", Canadian Airlines, http://web.archive.org/web/19970704234541/www.cdnair.ca/cpi.html, Copyright (c) 1994-1997—Canadian Airlines International Ltd., 1.

(Continued)

*Primary Examiner* — Arthur Duran
(74) *Attorney, Agent, or Firm* — Schwegman Lundberg & Woessner, P.A.

(57) ABSTRACT

A method and system to facilitate an online promotion in a network-based marketplace. A user-provided election to participate in the online promotion is recorded on a client machine associated with a user. Responsive to a trigger event, a determination of the user-provided election as recorded on the client machine associated with the user is made. The determination causes a presentation of the online promotion if so elected.

27 Claims, 33 Drawing Sheets

(56) References Cited

U.S. PATENT DOCUMENTS

| | | | |
|---|---|---|---|
| 5,128,752 A | 7/1992 | Von Kohorn | |
| 5,136,501 A | 8/1992 | Silverman et al. | |
| 5,168,446 A | 12/1992 | Wiseman | |
| 5,202,826 A | 4/1993 | McCarthy | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,287,268 A | 2/1994 | McCarthy | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,375,055 A | 12/1994 | Togher et al. | |
| 5,380,991 A | 1/1995 | Valencia et al. | |
| 5,394,324 A | 2/1995 | Clearwater | |
| 5,401,946 A | 3/1995 | Weinblatt | |
| 5,426,281 A | 6/1995 | Abecassis | |
| 5,485,510 A | 1/1996 | Colbert | |
| 5,537,314 A | 7/1996 | Kanter | |
| 5,553,145 A | 9/1996 | Micali | |
| 5,557,728 A | 9/1996 | Garrett et al. | |
| 5,598,557 A | 1/1997 | Doner et al. | |
| 5,638,457 A | 6/1997 | Deaton et al. | |
| 5,640,569 A | 6/1997 | Miller et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,886 A | 1/1998 | Christensen et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,727,165 A | 3/1998 | Ordish et al. | |
| 5,734,838 A | 3/1998 | Robinson et al. | |
| 5,740,252 A | 4/1998 | Minor et al. | |
| 5,757,917 A | 5/1998 | Rose et al. | |
| 5,761,648 A | 6/1998 | Golden et al. | |
| 5,771,291 A | 6/1998 | Newton et al. | |
| 5,771,380 A | 6/1998 | Tanaka et al. | |
| 5,774,870 A | 6/1998 | Storey | |
| 5,778,178 A | 7/1998 | Arunachalam | |
| 5,790,790 A | 8/1998 | Smith et al. | |
| 5,794,210 A * | 8/1998 | Goldhaber et al. | 705/14 |
| 5,794,219 A | 8/1998 | Brown | |
| 5,799,285 A | 8/1998 | Klingman | |
| 5,803,500 A | 9/1998 | Mossberg | |
| 5,806,044 A | 9/1998 | Powell | |
| 5,818,914 A | 10/1998 | Fujisaki | |
| 5,822,737 A | 10/1998 | Ogram | |
| 5,826,241 A | 10/1998 | Stein et al. | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,848,396 A * | 12/1998 | Gerace | 705/10 |
| 5,850,442 A | 12/1998 | Muftic | |
| 5,855,007 A | 12/1998 | Jovicic et al. | |
| 5,855,008 A | 12/1998 | Goldhaber et al. | |
| 5,872,848 A | 2/1999 | Romney et al. | |
| 5,873,069 A | 2/1999 | Reuhl et al. | |
| 5,883,620 A | 3/1999 | Hobbs et al. | |
| 5,884,056 A | 3/1999 | Steele | |
| 5,884,277 A | 3/1999 | Khosla | |
| 5,890,138 A | 3/1999 | Godin et al. | |
| 5,897,621 A | 4/1999 | Boesch et al. | |
| 5,897,622 A | 4/1999 | Blinn et al. | |
| 5,903,874 A | 5/1999 | Leonard et al. | |
| 5,905,975 A | 5/1999 | Ausubel | |
| 5,922,074 A | 7/1999 | Richard et al. | |
| 5,926,794 A | 7/1999 | Fethe | |
| 5,945,652 A | 8/1999 | Ohki et al. | |
| 5,945,653 A | 8/1999 | Walker et al. | |
| 5,953,423 A | 9/1999 | Rosen | |
| 5,956,694 A | 9/1999 | Powell | |
| 5,960,409 A | 9/1999 | Wexler | |
| 5,963,917 A | 10/1999 | Ogram | |
| 5,970,469 A | 10/1999 | Scroggie et al. | |
| 5,983,196 A | 11/1999 | Wendkos | |
| 5,987,500 A | 11/1999 | Arunachalam | |
| 5,991,739 A | 11/1999 | Cupps et al. | |
| 6,009,412 A | 12/1999 | Storey | |
| 6,014,634 A | 1/2000 | Scroggie et al. | |
| 6,014,635 A | 1/2000 | Harris et al. | |
| 6,029,015 A | 2/2000 | Ishiguro | |
| 6,029,141 A | 2/2000 | Bezos et al. | |
| 6,029,150 A | 2/2000 | Kravitz et al. | |
| 6,035,280 A | 3/2000 | Christensen | |
| 6,035,288 A | 3/2000 | Solomon | |
| 6,035,402 A | 3/2000 | Vaeth et al. | |
| 6,039,244 A | 3/2000 | Finsterwald | |
| 6,044,363 A | 3/2000 | Masakatsu et al. | |
| 6,047,264 A | 4/2000 | Fisher et al. | |
| 6,047,274 A | 4/2000 | Johnson et al. | |
| 6,052,670 A | 4/2000 | Johnson | |
| 6,055,518 A | 4/2000 | Franklin et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,085,176 A | 7/2000 | Woolston | |
| 6,101,485 A | 8/2000 | Fortenberry et al. | |
| 6,105,001 A | 8/2000 | Masi et al. | |
| 6,105,008 A | 8/2000 | Davis et al. | |
| 6,119,137 A | 9/2000 | Smith et al. | |
| 6,138,106 A | 10/2000 | Walker et al. | |
| 6,173,267 B1 | 1/2001 | Cairns | |
| 6,178,408 B1 | 1/2001 | Copple et al. | |
| 6,192,407 B1 | 2/2001 | Smith et al. | |
| 6,199,079 B1 | 3/2001 | Gupta et al. | |
| 6,202,051 B1 | 3/2001 | Woolston | |
| 6,212,556 B1 | 4/2001 | Arunachalam | |
| 6,237,145 B1 | 5/2001 | Narasimhan et al. | |
| 6,243,691 B1 | 6/2001 | Fisher et al. | |
| 6,246,996 B1 | 6/2001 | Stein et al. | |
| 6,266,651 B1 | 7/2001 | Woolston | |
| 6,266,652 B1 | 7/2001 | Godin et al. | |
| 6,278,980 B1 | 8/2001 | Wendkos | |
| 6,321,208 B1 | 11/2001 | Barnett et al. | |
| 6,321,210 B1 | 11/2001 | O'Brien et al. | |
| 6,330,543 B1 | 12/2001 | Kepecs | |
| 6,332,126 B1 | 12/2001 | Peirce et al. | |
| 6,336,009 B1 | 1/2002 | Suzumi et al. | |
| 6,336,098 B1 | 1/2002 | Fortenberry et al. | |
| 6,336,099 B1 | 1/2002 | Barnett et al. | |
| 6,401,077 B1 | 6/2002 | Godden et al. | |
| 6,450,407 B1 | 9/2002 | Freeman et al. | |
| 6,490,602 B1 | 12/2002 | Kraemer | |
| 6,505,168 B1 | 1/2003 | Rothman et al. | |
| 6,556,975 B1 | 4/2003 | Wittsche | |
| 6,571,216 B1 | 5/2003 | Garg et al. | |
| 6,578,012 B1 | 6/2003 | Storey | |
| 6,594,640 B1 | 7/2003 | Postrel | |
| 6,628,307 B1 | 9/2003 | Fair | |
| 6,643,624 B2 | 11/2003 | Philippe et al. | |
| 6,839,683 B1 | 1/2005 | Walker et al. | |
| 6,842,739 B2 | 1/2005 | Postrel | |
| 6,865,547 B1 | 3/2005 | Brake, Jr. et al. | |
| 6,895,386 B1 | 5/2005 | Bachman et al. | |
| 7,162,436 B1 | 1/2007 | Eckel, Jr. | |
| 7,318,049 B2 | 1/2008 | Iannacci | |
| 2001/0007099 A1 | 7/2001 | Rau et al. | |
| 2001/0009005 A1 | 7/2001 | Godin et al. | |
| 2001/0023407 A1 | 9/2001 | Liyanearachchi et al. | |
| 2001/0027436 A1 | 10/2001 | Tenembaum | |
| 2001/0032164 A1 | 10/2001 | Kim | |
| 2001/0047308 A1 | 11/2001 | Kaminsky | |
| 2001/0049628 A1 | 12/2001 | Icho | |
| 2001/0049634 A1 | 12/2001 | Stewart | |
| 2001/0049647 A1 | 12/2001 | Sheehan et al. | |
| 2002/0013774 A1 | 1/2002 | Morimoto | |
| 2002/0038282 A1 | 3/2002 | Montgomery | |

(56) References Cited

U.S. PATENT DOCUMENTS

| | | | |
|---|---|---|---|
| 2002/0040344 A1 | 4/2002 | Preiser et al. | |
| 2002/0046157 A1 | 4/2002 | Solomon | |
| 2002/0049664 A1 | 4/2002 | Hoffman et al. | |
| 2002/0069134 A1 | 6/2002 | Solomon | |
| 2002/0069184 A1 | 6/2002 | Tilly et al. | |
| 2002/0091580 A1 | 7/2002 | Wang | |
| 2002/0111889 A1 | 8/2002 | Buxton et al. | |
| 2002/0120548 A1 | 8/2002 | Etkin | |
| 2002/0120554 A1 | 8/2002 | Vega | |
| 2002/0138649 A1 | 9/2002 | Cartmell et al. | |
| 2002/0143612 A1 | 10/2002 | Barik et al. | |
| 2002/0143614 A1 | 10/2002 | Maclean et al. | |
| 2002/0147655 A1 | 10/2002 | Say | |
| 2002/0174050 A1 | 11/2002 | Eynard et al. | |
| 2003/0004809 A1 | 1/2003 | Palcic et al. | |
| 2003/0014350 A1 | 1/2003 | Duell et al. | |
| 2003/0050861 A1 | 3/2003 | Martin et al. | |
| 2003/0083943 A1 | 5/2003 | Adams et al. | |
| 2003/0105705 A1 | 6/2003 | Eyre | |
| 2003/0163575 A1* | 8/2003 | Perkins et al. | 709/229 |
| 2003/0233278 A1* | 12/2003 | Marshall | 705/14 |
| 2004/0204990 A1 | 10/2004 | Lee et al. | |
| 2004/0204991 A1 | 10/2004 | Monahan et al. | |
| 2004/0215467 A1 | 10/2004 | Coffman et al. | |

OTHER PUBLICATIONS

"AA/US Alliance Question", g=mileage+combine+redeem&hl=en&lr=&ie=UTF-8&oe=UTF-8&selm=6s1oa8%24v66%241%40nnrp1.dejanews.com&rnum=9, Feb. 18, 2004, 1page.
"American Express Membership Rewards: A Good Deal or Not?", q=combine+points+programs&hl=en&lr=&ie=UTF-8&oe=UTF-8&selm=crazyone-2509972357090001%40async83.city-net.com&rnum=4, Feb. 18, 2004, 2 pages.
"Aviation Competition: Effects on Consumers from Domestic Airline Alliances Vary", q=mileage+combine+redeem&hl=en&lr=&ie=UTF-8&oe=UTF-8&selm=GAORPTrc99037.txtp2%40us.govnews.org&rnum=6, GAO report about Northwest-Continental alliance notes: ?Passengers who belong to both American's and US Airways' frequent flyer programs will be able to combine miles from both airlines to redeem an award for travel on either airline.?,21.
"Biz-to-Biz Buzz May 24, 2000. (News Briefs)", *Newsbytes PM*, (May 24, 2000),N/A.
"Business Roundup. (News Briefs)", *InternetWeek*, (Apr. 5, 1999),p. 7.
"Combinable Miles Are the Stuff of Frequent Flyers' Dreams", FrequentFlier.com—helpinq frequent flyers earn more miles and travel awards throuqh fre . . . , May 25, 1998, http://frequentflier.com/ff052498.htm, Feb. 10, 2004, 4.
"Continental Airlines OnePass—Interactive Reward Charts", file://\\Bstz-tkgukobdl5\Clients_A_M\EBAY\P107\Prior%20Art\Rewards4.html, pp. 1-8.
"Delta . . . a long relationship ends", q=mileage+combine+redeem&hl=en&lr=&ie=UTF-8&oe=UTF-8&selm=7adhof%24me8%241%40news-1.news.gte.net&rnum=5, Someone saying that starting Jan. 1, 1999 you could combine AA and USAir miles to redeem on either,1.
"Exchange of Ideas: Why the street is in love with Purchasepro.com's congeries of revenue models . . . ", *Red Herring*, vol. 76,(Mar. 1, 2000),2 pgs.
"Family of Web rental applications unveiled", *KM World*, vol. 9, No. 2,(Mar. 1, 2000),1 page.
"Government agencies can procure materials. (BidTheWorld.com)", *Link-Up*, Vo. 17, No. 1,(Jan. 1, 2000),p. 19.
"Keeping You Informed", *Canadian membership guide*, pp. 6-7, www.cdnair.ca, pp. 6-7.
"Last minute gift ideas and stocking stuffers from AT&T", http://www.att.com/news/1294/941221.csa.html *AT&T News Release*, Dec. 21, 1994,, ?AT&T True Rewards ? Points can be redeemed for frequent flyer miles on Delta, United and USAir, AT&T Long-Distance Certificates and selected Walt Disney company products and services.?,2 pgs.
"OnePass Online Auction", Continential Airlines, file://\\Bstz-tkgukobd15\15CLIENTS_A_M\EBAY\P107\Prior%20Art\Copy%20of%20OnePass%20Online% . . . , 1 pg.
"Personal Optimized Decision/Transaction Program", *IBM Technical Disclosure Bulletin*, vol. 38, No. 1., (Jan. 1995),pp. 83-84.
"Requesting a Reward", Continental Airlines OnePass—Requestinq a Reward, file://\\Bstz-tkgukobd15\CLIENTS_A_M\EBAY\P107\Prior%20Art\Rewards2_files\onepass_fr_main_files\r . . . , Jul. 28, 2004, Copyright 2001 Continental Airlines,2 pgs.
"Service helps hospitals shop online. (Company Business and Marketing)", *Link-Up*, May/Jun. 2000, vol. 17, No. 3, Supplied by the British Library—"The world's knowledge" www.bl.uk,(May 1, 2000),p. 14.
"Web beacon", http://www.webopedia.com/TERM/W/Web_beacon.html, Webopedia.com, Last modified: Aug. 21, 2003.Copyright 2003 Jupitermedia Corporation.,(Jan. 22, 2002),3 pgs.
"Welcome to ShopOnePass", *Continental Airlines ShopOnePass*, file://\\Bstz-thgukobd15\Clients_A_M\EBAY\P107\Prior%20Art\Continental%20Airlines%, Copyright (c) 2002 Continental Airlines, Inc., 1.
"Welcome to the Sloan Career Development Office Interview Bidding and Scheduling System", *CDO Interview Bidding & Scheduling*—Login, file://\\Bstz-tkgukobd15\Clients—A_M\EBAY\P107\Prior%20Art\CDO%20Interview%20Bi . . . , 3 pgs.
Asbrand, Deborah , "Taking Stock in Trading Exchanges (Industry Trend on Event)", *Electronic Business*, http://www.reed-electronics.com/eb-mag/index.asp?layout=articlePrint&articleID=CA42124, Apr. 15, 2004,(Apr. 1, 2000),2 pgs.
Chan, H.C.B. , "Design and implementation of a mobile agent-based auction", *IEEE Pac RIM Conf Commun Comp Proc*, vol. II,(2001),pp. 740-743.
Chen, Jian , et al., "Bidder's strategy under group-buying auction on the Internet", *IEEE Transactions on Systems, Man & Cybernetics, A (Systems and Humans)*, vol. 32, No. 6,(Nov. 2002),pp. 680-690.
Creed, Adam , "Haggling Online in the Philippines. (Magtawaran Auction) (Company Business and Marketing) (Brief Article)", *Newsbytes*, (May 1, 2000),2 pgs.
Dalton, Gary , "Going, Going, Gone!: E-commerce is leading to an anything goes . . . ", *Information Week*, vol. 755,(Oct. 4, 1999),44 pages.
Davidow, Emily , "The dynamics of pricing/ Annotated Title: There are many forms of dynamic pricing marketplaces, bid-ask, and auctions; electronic commerce and technology has affected the art of pricing", *E-Commerce Business*, Journal,(Feb. 2000),p. 42.
Edwards, Morris , "New B2B players spreads benefits of e-commerce", *Communications News*, vol. 38, No. 1, (Jan. 1, 2001),p. 98.
Edwards, Mark J., "Your Web Browser is Bugged", www.ntsecurity.net/Articles/Index.cfm?ArticleID=9543, www.ntsecurity.net/Articles/Index.cfm?ArticleID=9543,(Jul. 13, 2000),3 pages.
Fisher, Dennis , "More goods on the block: Waybid, Bid.com open a wider range to buyers", *eWeek*, vol. 17, No. 55,(Dec. 18, 2000),39 pages.
Franse, Karen , "Distribution Briefs", *VARbusiness*, Mar. 11, 2002, http://www.varbusiness.com/Components/printArticle.asp?ArticleID=33901, Apr. 7, 2004, (Mar. 18, 2002),2.
Furger, Roberta , "Working the Web Bazaar", PC World.com—Working the Web Bazaar, PC World magazine, May 2000, http://www.pcworld.com/resource/printable/article/0,aid,15823,00.asp, Apr. 7, 2004, vol. 18, No. 5,(May 1, 2001),10..
Furger, Roberta , "Working the Web Browser", PC World, vol. 18, No. 5,(May 1, 2000),135 pages.
Goldsborough, Reid , "Internet Auctions Examined", *Link-Up*, p. 24, vol.17, No. 6, reidgold@netaxs.com,(Nov./Dec. 2000),1 pg.
Goldstein, D.E. , "Medical E-procurement-navigating in a B2B market", *Health Management Technology*, vol. 21, No. 8,(Aug. 2000),pp. 30-36.

(56) References Cited

OTHER PUBLICATIONS

Greengard, Samuel, "What traffic will bear: Companies are using new strategies", *Business Finance*, vol. 7, No. 3,(Mar. 1, 2001),48 pages.

Gupta, Pankaj, "Most Flexible FF", http://groups.google.com/groups?q=combine+points+programs&hl=en&lr=&ie=UTF-8&oe=UTF-8&selm=555t5k%24r1j%40hpax.cup.hp.com&rnum=8,%202/20/2004, Google Search: combine points programs,2 pgs.

Jaroneczyk, Jennifer, "Sold on an old idea. (Internet/Web/Online Service Information)", *Internet World*, Vo. 7, No. 4,(Feb. 15, 2001),p. 22.

Jaroneczyk, Jennifer, "Sold on an old idea: Though dynamic pricing has been around for . . . ", *Internet World*, (Feb. 15, 2001),22 pages.

Jaroneczyk, Jennifer, "Sold on an Old Idea: Though dynamic pricing has been around . . . ", Internet World Feb. 15, 2001 ,22 pages.

Kalin, Sari, "How Low can you go? If your smart, you'll decide your online . . . ", *Darwin Magazine*, Apr. 2001, http://www.darwinmag.com/read/040101/low.html, May 3, 2004, vol. 1, No. 7,(Apr. 1, 2001),5.

Kumar, Manoj, et al., "Sales Promotions on the Internet", IBM Research.Division, T.J. Watson Research Center, Yorktown Heights, NY 10598, mkumar, anand, anant, rakesh@watson.ibm.com, 11.

Lindsay, Jeff, et al., "The Historic Use of Computerized Tools for Marketing and Market Research: A Brief Survey", *Electronic Tools for Market Research: A Historical Survey*, www.jefflindsay.com/market-research.shtml, Kimberly-Clark Corporation, 2100 Winchester Road, Neenah, WI 54956, Updated Dec. 27, 2001, 20.

McKendrick, Joseph, "eMarket Shakeout: Old Economy Players Step Up", *Electronic Commerce World*, vol. 10, No. 11,(Nov. 1, 2000),34 pages.

Merlino, Laurel, "auction anxiety . . . ", *Upside*, (Oct. 1, 2000),246 pages.

Mitchell, Lori, "BayBuilder delivers easy, profitable reverse auctions", *InfoWorld*, vol. 22, No. 22,(Jun. 5, 2000),52 pages.

Mollison, Caitlin, "America West airlines opts for reverse auctions: the airline selected MaterialNet;s software to control spending with key suppliers and cut costs. ( A case study)", *Internet World*, vol. 8, No. 4,(Dec. 15, 1999),p. 42.

Mollman, Steve, "Name your price: Are you ready to bicker over the cost of a sandwich? In the new economy, you won't pay retail for anything. (Industry or Trend Event)", *PC/Computing*, (Jan. 1, 2000),p. 56.

Mollman, Steve, "Sold! Never Pay Retail Again. Online auctions are changing the . . . ", *PC/Computing*, vol. 11, No. 1,(Feb. 1, 2000),130 pages.

Morgan, Lisa, "Pick your Lot: Build consumer-oriented auctions with AuctionBuilder", *InternetWeek.com*, vol. 829, 44pgs.,(Sep. 18, 2000),4 pgs.

Ohlson, Kathleen, "Looking behind, beyond B2B marketplace woes", *Network WorldFusion*, http://www.nwfusion.com/cgi-bin/mailto/x.cgi, vol. 18, No.22,(Jun. 11, 2001),4 pgs.

Patel, Jeetu, et al., "New Platform Options Fuel E-Commerce", *Information Week*, http://www.informationweek.com/shared/printHTMLArticle.jhtml?article=/779/precomme . . . , vol. 779,(Mar. 27, 2000),4 pgs.

Piccinelli, G, et al., "e-service composition: supporting dynamic definition of process-oriented negotiation parameters", *12th International Workshop on Database and Expert System Applications* 2001, p. 727, Hewlett-Packard Laboratories, http://csdl.computer.org/comp/proceedings/dexa/2001/1230/00/12300727abs.htm, Conference Paper, Munich, Germany,(Sep. 3, 2001),1 pg.

Queree, Anne, "Bid it out—Annotated Title: Purchasers will be able to gain control with "dynamics due to the growth of online auctions"", *Global Finance*, vol. 14, No. 1, British Library, www.bl.uk,(Jan. 2000),pp. 36-37.

Seminerio, Maria, "When you Gotta Take Stock", *eWeek Enterprise News & Reviews*, http://\\eweek.com/print_article/0,1761,a=13253,00.asp, vol. 17, No. 55, Copyright 2004 Ziff Davis Media, Inc.,(Dec. 11, 2000),2 pgs.

Strassmann, Paul A., "The Impact of B2B", *Computerworld*, http://www.computerworld.com/printthis/2000/0,4814,51535,00.html, Vo. 34, No. 44,(Oct. 2, 2000),3 pgs.

Turek, Norbert, "Online Portals Offer Bandwidth and Voice Services Annotated Title-Small and midsize firms are turning to online access to serivces that they might have problems . . . ", *Information Week.com*, http://www.informationweek.com/shared/printHTMLArticle.jhtml?article=/784/prb.andwid . . . , (May 1, 2000),4 pgs.

Weiss, Scott, "Pam Am FF Program", http://groups.goole.com/groups?q=mileage+combine+redeem&hl=en&lr=&ie=UTF-8&oe=UTF-8&selm=54303h%247r2%40news.bu.edu&rnum=1, 3 pgs.

Wilson, Tim, "B2B Sellers Fight Back on Pricing", *InternetWeek.com*, http://www.internetweek.com/lead/lead121200.htm vol. 841, Dec. 12, 2000 ,3 pgs.

Wilson, Tim, "Hubs Rate Poorly on Feature Depth: Many offer little beyond auctions", *InternetWeek.com*, http://www.internetweek.com/lead/lead100900.htm, vol. 832, Oct. 9, 2000 ,4 pgs.

"@wards online", Canadian Airlines, Copyright (c) 1994-1997—Canadian Airlines International Ltd., [Online]. Retrieved from the Internet: <URL: http://web.archive.org/web/19970704234541/www.cdnair.ca/cpi.html>, 1 page.

"U.S. Appl. No. 09/734,044, Advisory Action dated Mar. 23, 2009", 2 pgs.

"U.S. Appl. No. 09/734,044, Advisory Action dated May 2, 2008", 3 pgs.

"U.S. Appl. No. 09/734,044, Advisory Action dated Nov. 19, 2008", 2 pgs.

"U.S. Appl. No. 09/734,044, Appeal Brief filed Aug. 25, 2008", 27 pgs.

"U.S. Appl. No. 09/734,044, Appeal Brief filed Dec. 17, 2008", 26 pgs.

"U.S. Appl. No. 09/734,044, Final Office Action dated Jan. 4, 2008", 15 pgs.

"U.S. Appl. No. 09/734,044, Final Office Action dated Jan. 5, 2004", 7 pgs.

"U.S. Appl. No. 09/734,044, Final Office Action dated Mar. 7, 2007", 15 pgs.

"U.S. Appl. No. 09/734,044, Final Office Action dated Apr. 25, 2005", 11 pgs.

"U.S. Appl. No. 09/734,044, Non Final Office Action dated Aug. 11, 2004", 13 pgs.

"U.S. Appl. No. 09/734,044, Non Final Office Action dated Aug. 18, 2003", 7 pgs.

"U.S. Appl. No. 09/734,044, Non Final Office Action dated Aug. 29, 2006", 15 pgs.

"U.S. Appl. No. 09/734,044, Non Final Office Action dated Sep. 13, 2007", 14 pgs.

"U.S. Appl. No. 09/734,044, Pre-Appeal Brief Request filed May 20, 2008", 5 pgs.

"U.S. Appl. No. 09/734,044, Reply Brief filed Jun. 3, 2009", 6 pgs.

"U.S. Appl. No. 09/734,044, Response filed Mar. 4, 2008 to Final Office Action dated Jan. 4, 2008", 15 pgs.

"U.S. Appl. No. 09/734,044, Response filed 05-04-04 to Final Office Action dated Jan. 5, 2004", 15 pgs.

"U.S. Appl. No. 09/734,044, Response filed Jun. 25, 2007 to Final Office Action dated Mar. 7, 2007", 13 pgs.

"U.S. Appl. No. 09/734,044, Response filed Aug. 24, 2005 to Final Office Action dated Apr. 25, 2005", 12 pgs.

"U.S. Appl. No. 09/734,044, Response filed Oct. 9, 2003 to Non Final Office Action dated Aug. 18, 2003", 11 pgs.

"U.S. Appl. No. 09/734,044, Response filed Oct. 18, 2007 to Non-Final Office Action dated Sep. 13, 2007", 17 pgs.

"U.S. Appl. No. 09/734,044, Response filed Nov. 29, 2006 to Non Final Office Action dated Aug. 29, 2006", 9 pgs.

"U.S. Appl. No. 09/734,044, Response filed Dec. 13, 2004 to Non Final Office Action dated Aug. 11, 2004", 13 pgs.

"U.S. Appl. No. 09/969,449, Advisory Action dated Jun. 22, 2009", 3 pgs.

(56) References Cited

OTHER PUBLICATIONS

"U.S. Appl. No. 09/969,449, Appeal Brief filed Apr. 20, 2006", 29 pgs.
"U.S. Appl. No. 09/969,449, Appeal Brief filed Aug. 7, 2006", 30 pgs.
"U.S. Appl. No. 09/969,449, Examiner Interview Summary dated Mar. 4, 2008", 4 pgs.
"U.S. Appl. No. 09/969,449, Examiner Interview Summary dated May 19, 2009", 4 pgs.
"U.S. Appl. No. 09/969,449, Final Office Action dated Mar. 17, 2009", 11 pgs.
"U.S. Appl. No. 09/969,449, Final Office Action dated Nov. 3, 2004", 10 pgs.
"U.S. Appl. No. 09/969,449, Final Office Action dated Nov. 21, 2005", 16 pgs.
"U.S. Appl. No. 09/969,449, Final Office Action dated Nov. 29, 2007", 10 pgs.
"U.S. Appl. No. 09/969,449, Final Office Action dated Dec. 29, 2003", 9 pgs.
"U.S. Appl. No. 09/969,449, Non Final Office Action dated Apr. 25, 2005", 9 pgs.
"U.S. Appl. No. 09/969,449, Non Final Office Action dated May 11, 2004", 8 pgs.
"U.S. Appl. No. 09/969,449, Non Final Office Action dated Jul. 9, 2003", 8 pgs.
"U.S. Appl. No. 09/969,449, Non-Final Office Action dated Aug. 5, 2008", 8 pgs.
"U.S. Appl. No. 09/969,449, Non-Final Office Action dated Oct. 6, 2009", 12 pgs.
"U.S. Appl. No. 09/969,449, Pre-Appeal Brief Request filed Jan. 12, 2006", 4 pgs.
"U.S. Appl. No. 09/969,449, Reply Brief filed Jan. 3, 2007", 7 pgs.
"U.S. Appl. No. 09/969,449, Response filed Feb. 3, 2005 to Final Office Action dated Nov. 3, 2004", 17 pgs.
"U.S. Appl. No. 09/969,449, Response filed Mar. 29, 2004 to Final Office Action dated Dec. 29, 2003", 12 pgs.
"U.S. Appl. No. 09/969,449, Response filed Apr. 29, 2008 to Final Office Action dated Nov. 29, 2007", 16 pgs.
"U.S. Appl. No. 09/969,449, Response filed May 18, 2009 to Final Office Action dated Mar. 17, 2009", 14 pgs.
"U.S. Appl. No. 09/969,449, Response filed Jul. 17, 2009 to Advisory Action dated Jun. 22, 2009", 14 pgs.
"U.S. Appl. No. 09/969,449, Response filed Aug. 11, 2004 to Non Final Office Action dated May 11, 2004", 12 pgs.
"U.S. Appl. No. 09/969,449, Response filed Aug. 25, 2005 to Non Final Office Action dated Apr. 25, 2005", 12 pgs.
"U.S. Appl. No. 09/969,449, Response filed Oct. 9, 2003 to Non Final Office Action dated Jul. 9, 2003", 12 pgs.
"U.S. Appl. No. 09/969,449, Response filed Dec. 5, 2008 to Non Final Office Action dated Aug. 5, 2008", 16 pgs.
"U.S. Appl. No. 09/969,449, Response filed Feb. 8, 2010 to Non Final Office Action dated Oct. 6, 2009", 17 pgs.
"U.S. Appl. No. 10/407,756, Advisory Action dated Apr. 3, 2009", 3 pgs.
"U.S. Appl. No. 10/407,756, Final Office Action dated Jan. 7, 2009", 28 pgs.
"U.S. Appl. No. 10/407,756, Final Office Action dated Jan. 15, 2010", 16 pgs.
"U.S. Appl. No. 10/407,756, Non Final Office Action dated Aug. 6, 2009", 14 pgs.
"U.S. Appl. No. 10/407,756, Non-Final Office Action dated Jun. 27, 2008", 10 pgs.
"U.S. Appl. No. 10/407,756, Preliminary Amendment filed Nov. 3, 2003", 12 pgs.
"U.S. Appl. No. 10/407,756, Response filed Mar. 6, 2009 to Final Office Action dated Jan. 7, 2009", 14 pgs.
"U.S. Appl. No. 10/407,756, Response filed May 7, 2009 to Advisory Action dated Apr. 3, 2009", 14 pgs.
"U.S. Appl. No. 10/407,756, Response filed Sep. 26, 2008 to Non-Final Office Action dated Jun. 27, 2008", 17 pgs.

"U.S. Appl. No. 10/407,756, Response filed Nov. 6, 2009 to Non Final Office Action dated Aug. 6, 2009", 14 pgs.
"U.S. Appl. No. 10/412,188, Final Office Action dated Nov. 5, 2009", 17 pgs.
"U.S. Appl. No. 10/412,188, Non-Final Office Action dated Jun. 26, 2009", 25 pgs.
"U.S. Appl. No. 10/412,188, Response filed Jan. 5, 2010 to Final Office Action dated Nov. 5, 2009", 11 pgs.
"U.S. Appl. No. 10/412,188, Response filed Sep. 28, 2009 to Non Final Office Action dated Jun. 26, 2009", 11 pgs.
"U.S. Appl. No. 10/412,194, Advisory Action dated Jul. 6, 2009", 3 pgs.
"U.S. Appl. No. 10/412,194, Final Office Action dated Apr. 22, 2009", 9 pgs.
"U.S. Appl. No. 10/412,194, Non-Final Office Action dated Mar. 13, 2008", 31 pgs.
"U.S. Appl. No. 10/412,194, Non-Final Office Action dated Sep. 24, 2009", 9 pgs.
"U.S. Appl. No. 10/412,194, Non-Final Office Action dated Oct. 10, 2008", 8 pgs.
"U.S. Appl. No. 10/412,194, Response filed Jan. 9, 2009 to Non-Final Office Action dated Oct. 10, 2008", 17 pgs.
"U.S. Appl. No. 10/412,194, Response filed Jun. 13, 2008 to Non-Final Office Action dated Mar. 13, 2008", 20 pgs.
"U.S. Appl. No. 10/412,194, Response filed Jun. 22, 2009 to Final Office Action dated Apr. 22, 2009", 16 pgs.
"U.S. Appl. No. 10/412,194, Response filed Jul. 22, 2009 to Adisory Action dated Jul. 6, 2009", 16 pgs.
"Aviation Competition: Effects on Consumers from Domestic Airline Alliances Vary", [Online]. Retrieved from the Internet: <URL: http://groups.google.com/groups?q=mileage+combine+redeem&hl=en&lr=&ie=UTF-8&oe=UTF-8&selm=GAORPTrc99037.txtp2%40us.govnews.org&rnum=6>, (Feb. 2, 1999), 25 pages.
"Business Roundup", *Internet Week*, (Apr. 5, 1999), 7.
"Continental Airlines OnePass—Interactive Reward Charts", web site, transferred in, 1-8.
"Exchange of Ideas: Why the street is in love with Purchasepro.com's congeries of revenue models", No source listed, (Mar. 1, 2000), 2 pages.
"Family of Web Rental Applications Unveiled", *KMWorld*, 7(1), (Jan. 1, 1998), 2 pages.
"Government agencies can procure materials", *Link-up*, 17(1), (Jan. 1, 2000), p. 19.
"Keeping You Informed", *Canadian membership guide*, www.cdnair.ca, transferred in, 6-7.
"Last minute gift ideas and stocking stuffers from AT&T", *AT&T News Release*, [Online]. Retrieved from the Internet: <URL: http://www.att.com/news/1294/941221.csa.html>, (Dec. 21, 1994), 2 pages.
"OnePass Online Auction", *Continental Airlines*, transferred in, (2002), 1 page.
"Requesting a Reward", *Continental Airlines OnePass—Requesting a Reward*, transferred in, (2001), 2 pages.
"Service helps hospitals shop online", *Link-up*, (May/Jun. 2000), p. 14.
"Web Beacon", *Webopedia*, (Aug. 21, 2003), 3 pages.
"Welcome to ShopOnePass", *Continental Airlines ShopOnePass*, transferred in, 1 page.
"Welcome to the Sloan Career Development Office Interview Bidding and Scheduling System", *CDO Interview Bidding & Scheduling—Login*, transferred in, 3 pages.
Baumann, G. W, "Personal Optimized Decision/Transaction Program", *IBM Technical Disclosure Bulletin*, (Jan. 1995), 83-84.
Brown, Janelle, "What does it take to make a buck off of Usenet?", salon.com > *Technology*, [Online]. Retrieved from the Internet: <URL: www.salon.com/tech/feature/1999/05/24/deja>, (May 24, 1999), 4 pages.
Furger, Roberta, "Working the Web Bazaar", *PC World magazine*, (May 2000), 10 pages.
Mollman, Steve, "Sold! Never pay retail again. Online auctions are changing the way businesses buy and sell everything", *PC Computing*, (Feb. 2000), 131-151.

(56) References Cited

OTHER PUBLICATIONS

Pacek, Greg, "American Express Membership Rewards: A Good Deal or Not?", [Online]. Retrieved from the Internet: <URL: http://groups.google.com/groups?q=combine+points+programs&hl=en&lr=&ie=UTF-8&oe=UTF-8&selm=crazyone-2509972357090001%40async83.city-net.com&rnum=4>, (Sep. 25, 1997), 2 pages.

Roberson, G.W., "AA/US Alliance Question", [Online]. Retrieved from the Internet: <URL: http://groups.google.com/q=mileage+combine+redeem&hl=en&lr=&ie=UTF-8&oe=UTF-8&selm=6s1oa8%24v66%241%40nnrp1.dejanews.com&rnum=9>, (Aug. 26, 1998), 1 page.

Seminerio, Maria, "When You Gotta Take Stock", *EWeek*, http://www.eweek.com/article2/0%2C1759%2C1243705%2C00.asp, (Dec. 11, 2000), 2 pages.

Staff, Newsbytes, "Biz to Biz Buzz", *Newsbytes PM*, (May 24, 2000), 2 pages.

Tadjr, "Delta . . . a long relationship ends", [Online]. Retrieved from the Internet: <URL: http://groups.google.com/groups?q=mileage+combine+redeem&hl=en&lr=&ie=UTF-8&oe=UTF-8&selm=7adhof%24me8%241%40news-1.news.gte.net&rnum=5>, (Feb. 17, 1999), 1 page.

Wilson, Tim, "Hubs Rate Poorly on Feature Depth", *InternetWeek.com*, http://www.internetweek.com/lead/lead100900.htm, (Oct. 9, 2000), 4 pages.

Winship, Tim, "Combinable Miles Are the Stuff of Frequent Flyers' Dreams", FrequentFlier.com-helping_frequent_flyers_earn_more_miles_and_travel_awards_through_free . . . , transferred in, (May 25, 1998), 4 pages.

"U.S. Appl. No. 09/734,044, Appeal Brief filed Feb. 4, 2010", 25 pgs.

"U.S. Appl. No. 09/969,449, Final Office Action dated May 3, 2010", 10 pgs.

"U.S. Appl. No. 10/407,756, Pre-Appeal Brief Request filed Apr. 15, 2010", 5 pgs.

"U.S. Appl. No. 10/412,188, Non-Final Office Action dated Feb. 24, 2010", 14 pgs.

"U.S. Appl. No. 09/734,044, Reply Brief filed Jun. 22, 2010", 7 pgs.

"U.S. Appl. No. 09/969,449, Appeal Brief filed Nov. 29, 2010", 29 pgs.

"U.S. Appl. No. 09/969,449, Examiner's Answer dated Feb. 7, 2011", 16 pgs.

"U.S. Appl. No. 10/407,756, Appeal Brief filed Jul. 27, 2010", 27 pgs.

"U.S. Appl. No. 10/407,756, Decision on Pre-Appeal Brief Request dated May 27, 2010", 2 pgs.

"U.S. Appl. No. 10/412,188, Advisory Action dated Oct. 1, 2010", 3 pgs.

"U.S. Appl. No. 10/412,188, Response filed Sep. 7, 2010 to Final Office Action dated Jul. 7, 2010", 14 pgs.

"U.S. Appl. No. 10/412,194, Non-Final Office Action dated Nov. 1, 2010", 6 pgs.

"U.S. Appl. No. 10/412,194, Response filed Feb. 1, 2011 to Non Final Office Action dated Nov. 1, 2010", 16 pgs.

"U.S. Appl. No. 10/412,194, Response filed Sep. 13, 2010 to Non Final Office Action dated Sep. 24, 2009", 15 pgs.

U.S. Appl. No. 13/565,606, filed Aug. 2, 2012 Method and System to Discharge a Liability Associated With a Proprietary Currency.

"U.S. Appl. No. 10/412,017, Advisory Action dated Aug. 19, 2010", 3.

"U.S. Appl. No. 10/412,188 Final Office Action dated Jul. 7, 2010", 21 pgs.

"U.S. Appl. No. 10/412,188, Response filed Jun. 24, 2010 to Non Final Office Action dated Feb. 24, 2010", 13 pgs.

"U.S. Appl. No. 09/734,044, Final Office Action dated Feb. 13, 2014", 53 pgs.

"U.S. Appl. No. 09/969,449, Examiner Interview Summary dated May 20, 2014", 6 pgs.

"U.S. Appl. No. 09/969,449, Non Final Office Action dated Mar. 20, 2014", 15 pgs.

"U.S. Appl. No. 09/969,449, Response filed Jun. 20, 2014 to Non Final Office Action dated Mar. 20, 2014", 11 pgs.

"U.S. Appl. No. 10/412,188, Non Final Office Action dated Jul. 9, 2014", 24 pgs.

"U.S. Appl. No. 10/412,194, Final Office Action dated May 12, 2014", 9 pgs.

"U.S. Appl. No. 10/412,194, Response filed Feb. 28, 2014 to Non Final Office Action dated Oct. 28, 2013", 19 pgs.

"U.S. Appl. No. 13/565,606, Non Final Office Action dated Jan. 16, 2014", 9 pgs.

"U.S. Appl. No. 13/565,606, Non Final Office Action dated Jul. 31, 2014", 10 pgs.

"U.S. Appl. No. 13/565,606, Response filed Apr. 3, 2014 to Non Final Office Action dated Jan. 16, 2014", 11 pgs.

"U.S. Appl. No. 09/969,449, Advisory Action dated Apr. 26, 2016", 2 pgs.

"U.S. Appl. No. 09/969,449, Examiner Interview Summary dated Dec. 8, 2014", 6 pgs.

"U.S. Appl. No. 09/969,449, Final Office Action dated Sep. 8, 2014", 14 pgs.

"U.S. Appl. No. 09/969,449, Final Office Action dated Nov. 6, 2015", 17 pgs.

"U.S. Appl. No. 09/969,449, Non Final Office Action dated Apr. 9, 2015", 16 pgs.

"U.S. Appl. No. 09/969,449, Response filed Mar. 9, 2015 to Final Office Action dated Sep. 8, 2014", 12 pgs.

"U.S. Appl. No. 09/969,449, Response Filed Apr. 6, 2016 to Final Office Action dated Nov. 6, 2015", 20 pgs.

"U.S. Appl. No. 09/969,449, Response filed Aug. 11, 2015 to Non Final Office Action dated Apr. 9, 2015", 27 pgs.

"U.S. Appl. No. 10/412,188 Examiner Interview Summary dated Dec. 16, 2016", 4 pgs.

"U.S. Appl. No. 10/412,188, Advisory Action dated May 12, 2017", 13 pgs.

"U.S. Appl. No. 10/412,188, Final Office Action dated Jan. 31, 2017", 35 pgs.

"U.S. Appl. No. 10/412,188, Final Office Action dated Dec. 24, 2014", 31 pgs.

"U.S. Appl. No. 10/412,188, Non Final Office Action dated Sep. 27, 2016", 35 pgs.

"U.S. Appl. No. 10/412,188, Response filed Mar. 24, 2015 to Final Office Action dated Dec. 24, 2014", 16 pgs.

"U.S. Appl. No. 10/412,188, Response filed May 1, 2017 to Final Office Action dated Jan. 31, 2017", 30 pgs.

"U.S. Appl. No. 10/412,188, Response filed Dec. 9, 2014 to Non Final Office Action dated Jul. 9, 2014", 14 pgs.

"U.S. Appl. No. 10/412,188, Response filed Dec. 26, 2016 to Non Final Office Action dated Sep. 27, 2016", 26 pgs.

"U.S. Appl. No. 10/412,194, Appeal Brief filed Dec. 8, 2014", 34 pgs.

"U.S. Appl. No. 10/412,194, Appeal Decision dated Jun. 13, 2017", 16 pgs.

"U.S. Appl. No. 10/412,194, Decision on Pre-Appeal Brief Request dated Nov. 6, 2014", 2 pgs.

"U.S. Appl. No. 10/412,194, Examiner's Answer to Appeal Brief dated Apr. 2, 2015", 12 pgs.

"U.S. Appl. No. 10/412,194, Pre-Appeal Brief Request filed Sep. 12, 2014", 5 pgs.

"U.S. Appl. No. 10/412,194, Reply Brief filed Jun. 2, 2015", 51 pgs.

"U.S. Appl. No. 13/565,606, Final Office Action dated Feb. 1, 2016", 18 pgs.

"U.S. Appl. No. 13/565,606, Final Office Action dated Dec. 15, 2014", 12 pgs.

"U.S. Appl. No. 13/565,606, Non Final Office Action dated Jul. 20, 2015", 14 pgs.

"U.S. Appl. No. 13/565,606, Response filed Feb. 17, 2015 to Final Office Action dated Dec. 15, 2014", 19 pgs.

"U.S. Appl. No. 13/565,606, Response filed Oct. 19, 2015 to Non Final Office Action dated Jul. 20, 2015", 13 pgs.

"U.S. Appl. No. 13/565,606, Response filed Oct. 30, 2014 to Non Final Office Action dated Jul. 31, 2014", 13 pgs.

\* cited by examiner

FIG. 9

ACTIVITY TABLE (89)

| ACTIVITY URL | ACTIVITY INDEX (151) |
|---|---|
|  |  |
|  |  |

145

AWARD TABLE (90)

| | 0 | | 1 | | 2 | |
|---|---|---|---|---|---|---|
| 0 | 2 | | | | | |
| | 1 | 156 | | | | |
| | 0 | | | | | |
| 1 | | | 0 | 3 | | |
| | | | 1 | 2 | | |
| | | | 2 | 1 | | |
| 2 | | | | | 0 | 6 |
| | | | | | 1 | 3 |
| | | | | | 2 | 0 |

FIRST ACTIVITY COLUMN 153

154 { 0, 1, 2 }

SECOND ACTIVITY ROW 155

Win Your Dream Car on XYZ Motors! 103

Instant Win Prizes

- $50,000.00 towards any car on XYZ Motors
- 50 Oil Changes
- 25 Car Washes

How to Enter and Play:

Each time you submit bid in an auction you receive a game card. Scratch off the three squares that cover the faces of Manny, Moe and Jack and you win!

To Opt-In, select:

☐ 107

YES! I Want to Win!!!

FIG. 22

Win Your Dream Car on XYZ Motors!

Instant Win Prizes

- $50,000.00 towards any car on eBay Motors
- 50 Oil Changes
- 25 Car Washes

How to Enter and Play:

Each time you submit bid in an auction you receive a game card. Scratch off the three squares that cover the faces of Manny, Moe and Jack and you win!

To Opt-Out, select:

☐ ⟋109

No! I do not want to Win!!!

FIG. 24

Bid Confirmation     117

---

Fun With Ballet for Future Ballerina Dancers

Item # 1545690652

Books:Children:Classics

Bidding is Closed for this item - You are the winner!

Item Price:                 $5.00
Shipping Instructions:    Please submit payment prior to shipment
Other Instructions:       Pay quickly to win an award!!!
                              The sooner you pay, the more valuable the award!!!

FIG. 25

Payment Confirmation     149

---

You sent US $3.99 to Jski (410) for Item #1545690652.

Description of Item
    Books: Children:Classics
    "Fun With Ballet for Future Ballerina Dancers"
    Books:Children:Classics
Date and time of Payment
    July 10, 2002 at 2:00 PM, PDT

FIG. 26

Listing Description Form 170

SELL YOUR ITEM: DESCRIBE YOUR ITEM

DESCRIPTION: 172

Encourage the buyer to use the XYZ Payment Service to pay for your item and if the buyer does so, you will receive a game card that may enable you to win a valuable award!!! 174

☑ YES, I want to encourage the buyer to use the XYZ third party payment service.

176

Listing Description Webpage 186

---

Book - FUN WITH BALLET FOR FUTURE BALLERINA DANCERS

Good condition
Hard cover
Published 1955
Illustrated
50 Pages

Try the easy to use XYZ Payment Service to pay for this item!!!

Thank You

Listing Description Webpage 339

Book - FUN WITH BALLET FOR FUTURE BALLERINA DANCERS

Good condition
Hard cover
Published 1955
Illustrated
50 Pages

FIG. 31

METHOD AND SYSTEM TO FACILITATE AN ONLINE PROMOTION RELATING TO A NETWORK-BASED MARKETPLACE

FIELD OF THE INVENTION

The present invention relates generally to the field of online promotions and, more specifically to a method and a system to facilitate an online promotion relating to network-based marketplace.

BACKGROUND OF THE INVENTION

Sellers have traditionally utilized promotional games to incentivize buyers to perform a commercial activity. For example, a seller may offer a prize or an opportunity to win a prize in response to the buyer purchasing a product or sampling a service or performing some other predetermined activity. With the advent of the Internet, the techniques and practices utilized to conduct promotions in an online environment create a number of challenges.

One challenge is distinguishing a user, located at a client machine, who desires to participate in an online promotion from a user who does not desire to participate in an online promotion. Typically a user is informed of an online promotion with a first web page that promises a prize, game card or some other promotional device in exchange for the user performing a predetermined activity. The user elects to participate in the online promotion by utilizing the first web page. Subsequently, the user performs the desired predetermined activity usually by requesting a second web page that is associated with the activity. If the user has elected to participate, then the online promotion is delivered.

The above described sequence of events presents a challenge to a client machine that operates on the World Wide Web (WWW) because the WWW is intrinsically stateless (i.e., each Web page is processed without any knowledge of previous pages). Thus, the users election, as requested with the first web page, is not immediately available to the second web page that is associated with the predetermined activity.

SUMMARY OF THE INVENTION

A method to facilitate an online promotion in a network-based marketplace includes causing a user-provided election to participate in the online promotion to be recorded on a client machine associated with a user; and responsive to a trigger event, requesting a determination of the user-provided election as recorded on the client machine associated with the user, the determination to cause a presentation of the online promotion if so elected.

A method to facilitate an online promotion in a network-based marketplace, the method includes, at a client machine associated with a user, recording a user-provided election to participate in the online promotion on the client machine; responsive to a trigger event, reading the user-provided election; and if the user-provided election indicates participation in the online promotion, presenting the online promotion to the user.

The invention extends to a machine-readable medium for storing instructions that, when executed by the machine, cause the, machine to execute any one of the methods described herein. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 9 illustrates an exemplary embodiment of an activity table and an exemplary award table within a database maintained by the exemplary network-based marketplace;

FIGS. 22-31 illustrates user interface screens relating to a network-based marketplace.

DETAILED DESCRIPTION

Methods and systems to facilitate online promotions in a network-based marketplace are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a network-based marketplace that allows users of the marketplace to transact products or services identified in listings, that are offered for sale by sellers. In addition, various embodiments of the network-based marketplace additionally allow users to post and view listings that may be transacted outside the electronic marketplace.

In one embodiment, the present invention is implemented as a network-based service that may be accessed through, for example, the Internet using a client application program such as a web browser. In another embodiment, the present invention is implemented as a network-based service that provides an application program interface that may be accessed through, for example, the Internet using a client application program such as a seller software tool.

Hardware and Software Components

Figure 1:
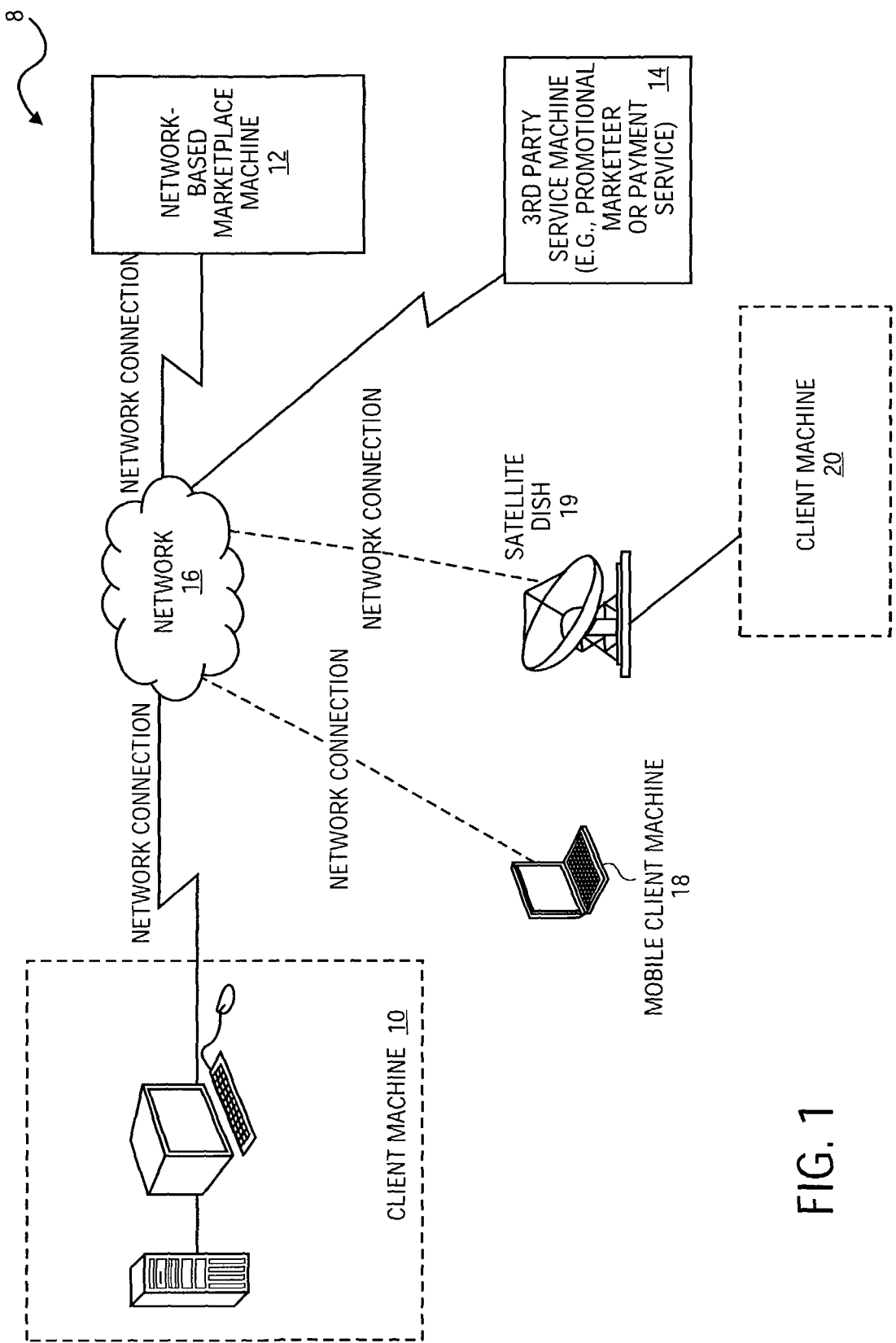
FIG. 1 is a block diagram illustrating an exemplary network-based marketplace machine, client machine, and a third party service machine.

FIG. 1 is a block diagram illustrating hardware components that may form part of a exemplary network-based marketplace 8. A client machine 10, a network-based marketplace machine 12, and a third party service machine 14 are coupled via a network 16. In some embodiments, users may participate in the marketplace using the mobile client machines 18, or the base client machines 20 coupled to the network 16 via a satellite connection 19.

Figure 2:
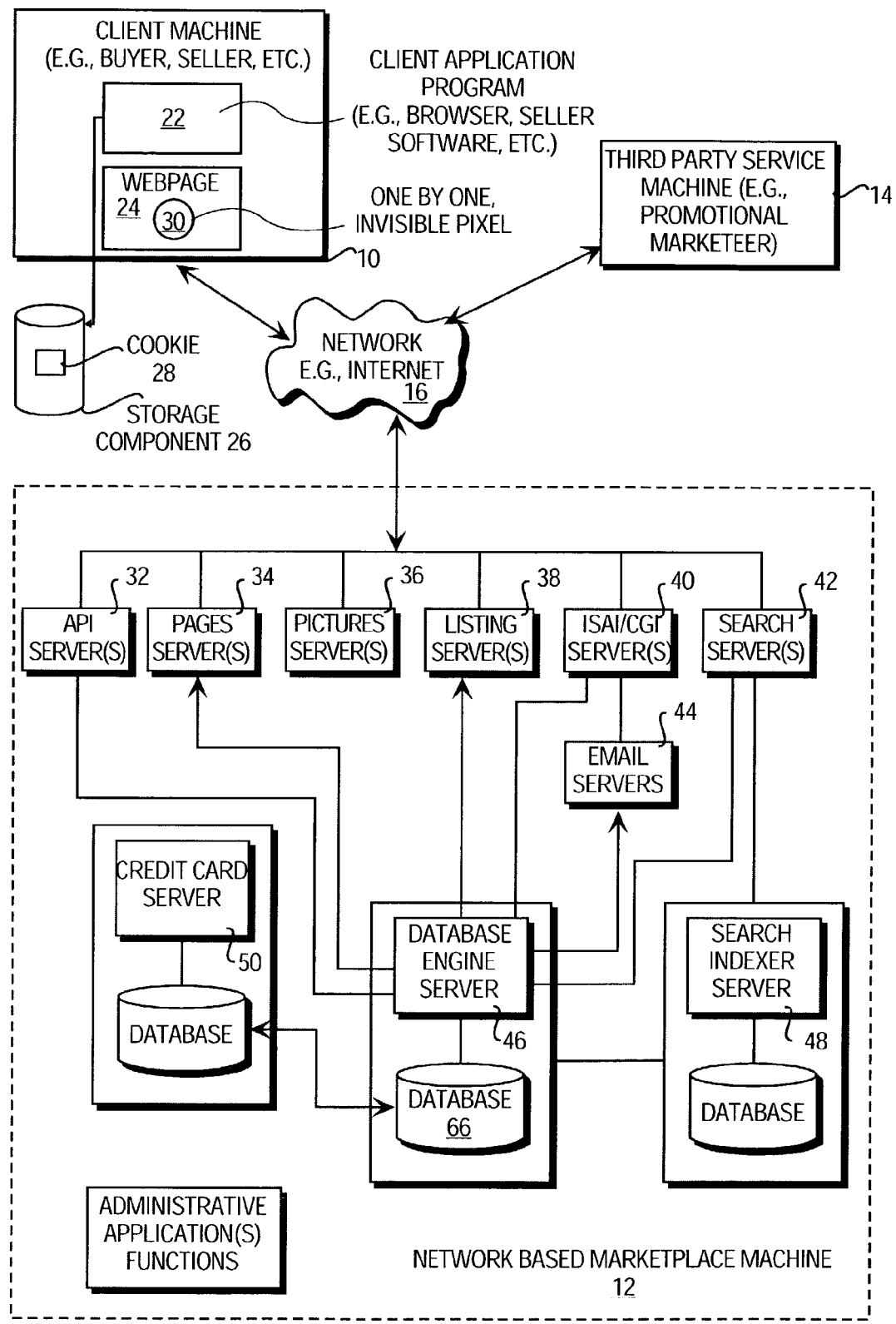
FIG. 2 is a block diagram illustrating software and hardware components utilized by an exemplary network-based marketplace.

FIG. 2 is a block diagram illustrating exemplary software and hardware components. The client machine 10 hosts a client application program 22, (e.g., a web browser, seller application, etc) and also stores and displays a communication in the exemplary form of a web page 24 a storage component 26 (e.g., a dish device) is also shown coupled to the client machine 10.

The client application program 22 may be embodied as a browser (for example, a Microsoft Internet Explorer browser developed by Microsoft™ Corporation of Richmond, Wash. or Navigator™ browser developed by Netscape of Mountain View, Calif.). The client application program 22 executes under an operating system (for example, Microsoft™ Windows developed by Microsoft™ Corporation or MacOS X developed by Apple Computers of Cupertino, Calif.). The client application program 22 may also be embodied as seller software enabling a seller to configure listings that encourage buyers to participate in various network-based marketplace activities. The client application program 22 may read the web page 24, which may include information that is written to the storage component 26. The client application program 22 may store information on the storage component 26 in the form of a cookie 28. Further, the web page 24 may include a one-by-one invisible pixel 30 in the form of HTML code that does not visibly appear on the web page 24 and directs the browser to perform various operations.

Referring now to FIG. 2, the network-based marketplace machine 12 is shown, in one embodiment to include one more of a number of types and servers, for example communication servers in the exemplary form of application program interface (API) servers 32, page servers 34 that deliver web pages (e.g., markup language documents), picture servers 36 that dynamically deliver images to be displayed within web pages, listing servers 38, processing servers in the exemplary form of CGI (or ISAPI) servers 40 that provide an intelligent interface to back-end servers, and search servers 42 that handle search requests to the network-based marketplace machine 12. The e-mail servers 44 provide, inter alia, automated e-mail communications to users of the network-based marketplace machine 12. The back-end servers include a database engine server 46, a search index server 48, and a credit card database server 50, each of which maintains and facilitates access to a respective database.

Figure 3:
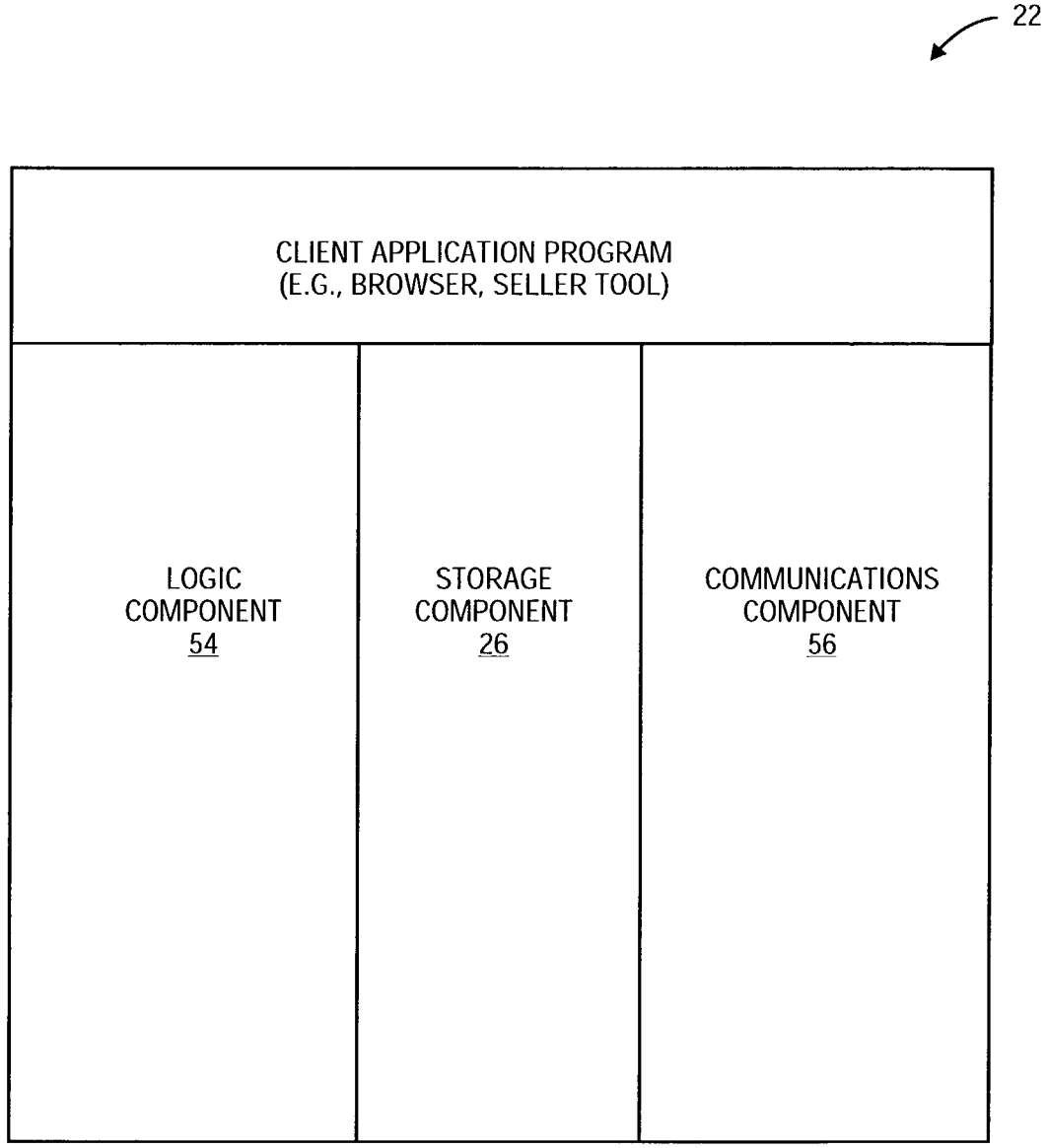
FIG. 3 is a block diagram illustrating an exemplary client application program.

FIG. 3 is a block diagram illustrating an exemplary architecture of the client application program 22. The client application program 22 includes a logic component 54, the storage component 26 and a communications component 56. The client application program 22 executes under the control of an operating system on the client machine 10, as previously described, and may be embodied as a browser, seller tool or some other application that is utilized to facilitate electronic commerce in the network-based marketplace machine 12.

Figure 4:
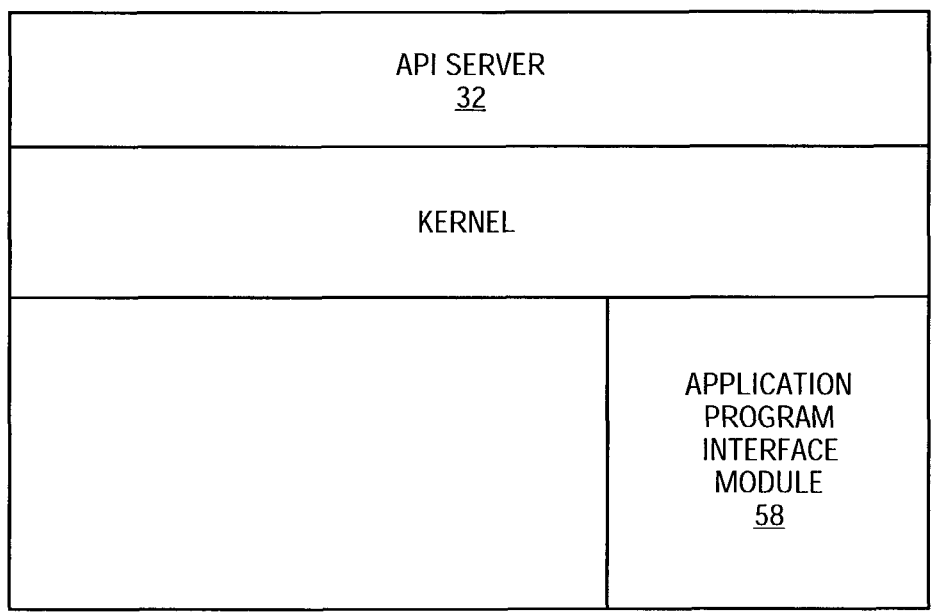
FIG. 4 is a block diagram illustrating an exemplary application program interface utilized for receiving a batch file and communicating messages.

FIG. 4 is a block diagram illustrating an exemplary application program interface in the form of an application program interface module (APIM) 58. The APIM 58 executes on the API server 32 and under kernel operating software to receive a batch file that is created by a seller and that is utilized to facilitate electronic commerce in the network-based marketplace machine 12.

Figure 5:
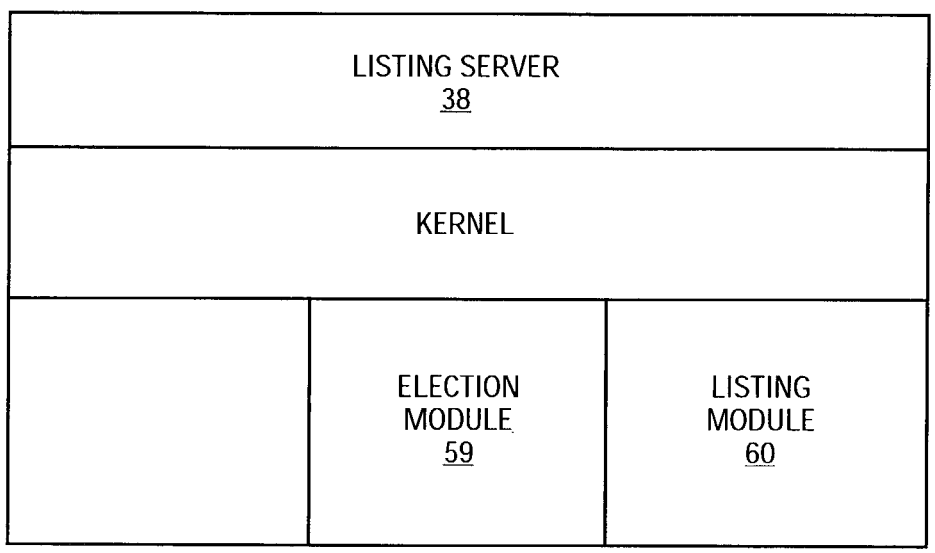
FIG. 5 is a block diagram illustrating an exemplary election module and an exemplary listing module for presenting exemplary user interfaces.

FIG. 5 is a block diagram illustrating an election module 59 and a listing module 60, according to an exemplary embodiment of the present invention, utilized for communicating user interfaces. The election module 59 and the listing module 60 operate under the control of kernel system software on the listing server 38.

Figure 6:
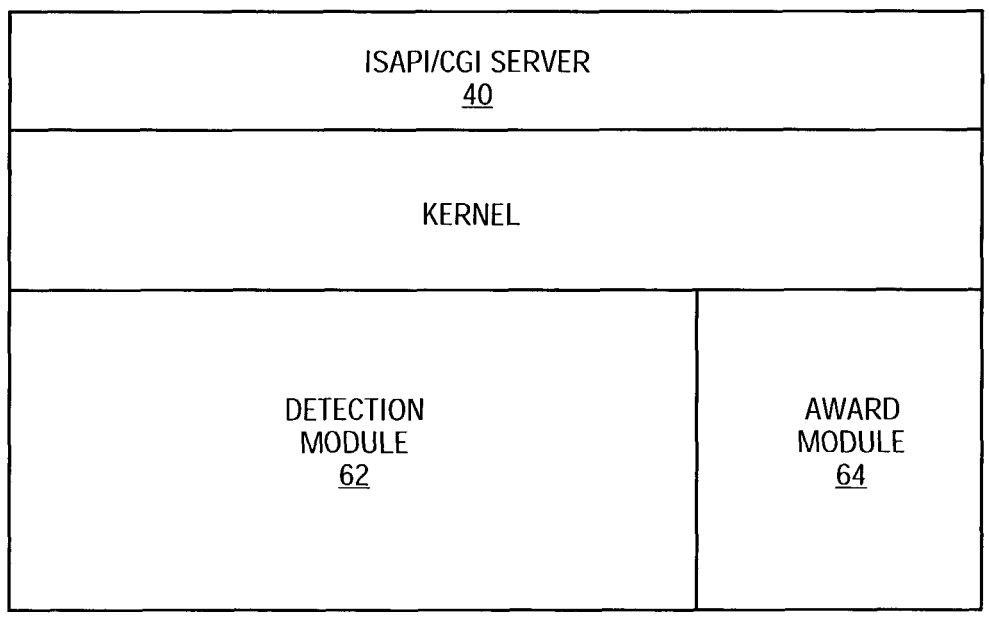
FIG. 6 is a block diagram illustrating an exemplary detection module and an exemplary award module utilized for promotion-related processing in the network-based marketplace.

FIG. 6 is a block diagram illustrating a detection module 62 and an award module 64 according to an exemplary embodiment of the present invention. The detection module 62 is utilized to detect events related to promotions and to record user-associated information. The award module 64 is utilized to determine the value of an award and award a user. The detection module 62 and the award module 64 operate under the control of kernel system software on the ISAPI/CGI server 40.

Figure 7:
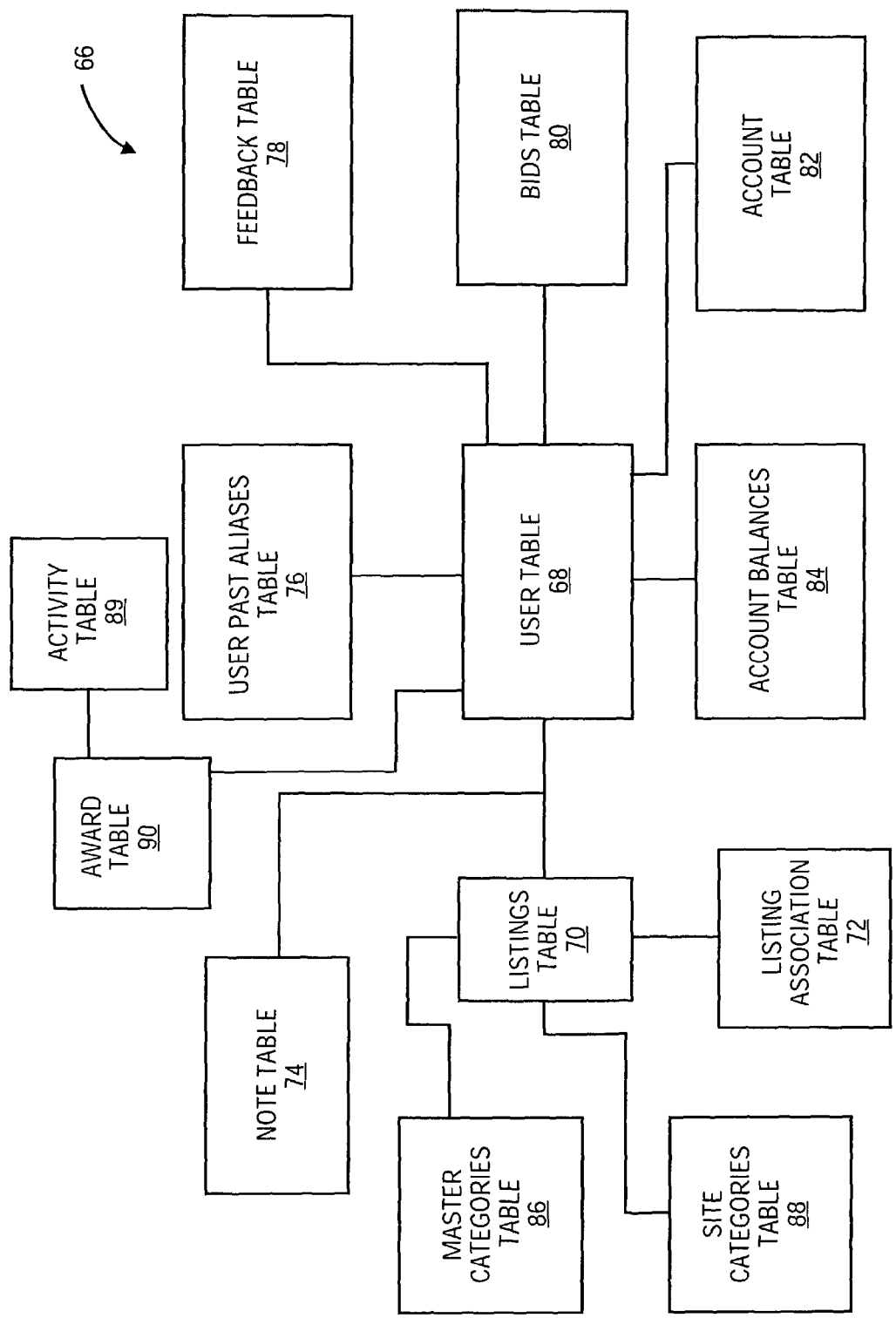
FIG. 7 is a database diagram illustrating an exemplary database maintained and accessed via a database engine server that supports the network-based marketplace.

FIG. 7 is a database diagram illustrating an exemplary database 66 maintained and accessed via a database engine server 46 that supports the network-based marketplace machine 12. The database 66 may, in one embodiment, be implemented as a relational database, and includes a number of tables having entries, or records, that are linked by indices and keys. In an alternative embodiment, the database 66 may be implemented as a collection of objects in an object-oriented database.

The database 66 includes a user table 68, which contains a record for each user of the network-based marketplace machine 12. A user may operate as a seller, buyer, or both, within the network-based marketplace machine 12. The database 66 also includes a listings table 70 that may be linked to the user table 68 and a listing association table 72. A record in the user table 68 is associated with a user and may be linked to multiple items that are being, or have been, transacted via the network-based marketplace machine 12.

The database 66 also includes a note table 74 populated with note records that may be linked to one or more listing records within the listing table 70 and/or to one or more user records within the user table 68. Each note record within the note table 74 may include, inter alia, a comment, description, history or other information pertaining to an item or service being auction via the network-based marketplace machine 12, or to a user of the network-based marketplace machine 12.

A number of other tables are also shown to be linked to the user table 68, namely a user past aliases table 76, a feedback table 78, a bids table 80, an accounts table 82, and an account balances table 84.

A master categories table 86 stores records for listing categories presented across multiple views (or presentations) of listing categories via regional or community sites presented by the network-based marketplace machine 12. A site categories table 88 stores records indicating which listing categories are to be presented for respective regional or community sites, (e.g., a country, region or city specific site) presented by the network-based marketplace machine 12.

The database 66 is also shown to include an activity table 89 and an award table 90 to enable an exemplary embodiment of the present invention. The activity table 89 and the award table 90 are utilized to associate a user activity to an elapsed time and an award.

Figure 13:
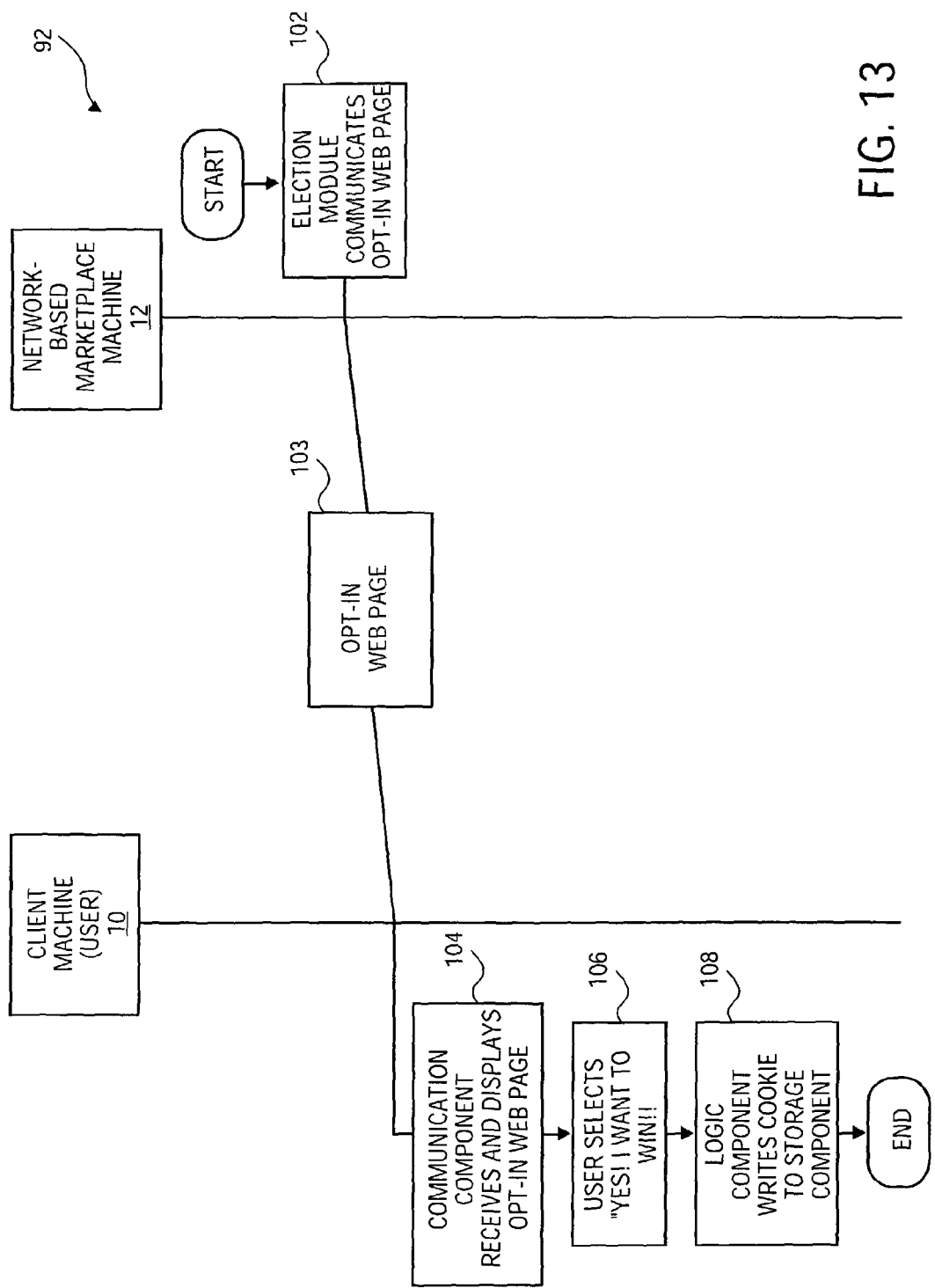
FIG. 13 is an interactive flow chart partially illustrating a method, according to an exemplary embodiment of the present invention, to facilitate an online promotion in a network-based marketplace.

Method to Facilitate an Online Promotion Relating to a Network-Based Marketplace FIG. 13 is an interactive flow chart illustrating a method 92, according to an exemplary embodiment of the present invention, to facilitate an online promotion in a network-based marketplace. Client and server operations are illustrated.

At box 102, the election module 59 on the listing server 38 in the network-based marketplace machine 12 generates and communicates an opt-in web page 103 to the user at the client machine 10. In one embodiment, the opt-in web page 103 is communicated to the user in response to the user selecting a promotion screen element that may appear on various pages presented by the network-based marketplace or other third-party services. In other embodiments, the opt-in web page 103 is communicated in response to a predetermined user activity.

Figure 23:
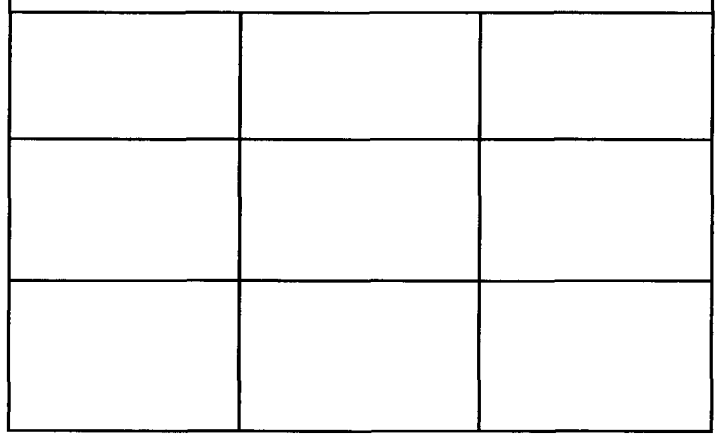

At box 104, the communications component 56 at the client machine 10 receives and displays the opt-in web page 103 to the user. FIG. 22 illustrates an exemplary embodiment of the opt-in web page 103 that includes an exemplary user-provided election in the form of an opt-in box 107. The opt-in web page 103 informs the user that each time a bid is submitted in an auction they will receive an exemplary online promotion in the form of a promotion game card 125 that appears in a pop-up window screen at the client machine 10 and enables the user to win a prize. FIG. 23 illustrates an exemplary promotion game card 125 in the form of a virtual scratch card game whereby the user wins a prize by "scratching" out the squares covering the faces of Manny, Moe and Jack. Other embodiments of the promotion game card 125 may include a watch and win promotion game card that provides a code to the user. The user must then watch a television program to see if the provided code corresponds to a code displayed during the television program.

Returning to FIG. 13, at box 106, the user asserts an election to opt-in to a promotional contest by selecting the opt-in box 107 "Yes! I want to win!!!" Otherwise the user implicitly opts-out.

At box 108, the logic component 54 on the client machine 10 writes the contents (e.g., a yes/no indication) of the opt-in box 107 into a cookie 28 located on the storage component 26 on the client machine 10 and ends.

Figure 14:
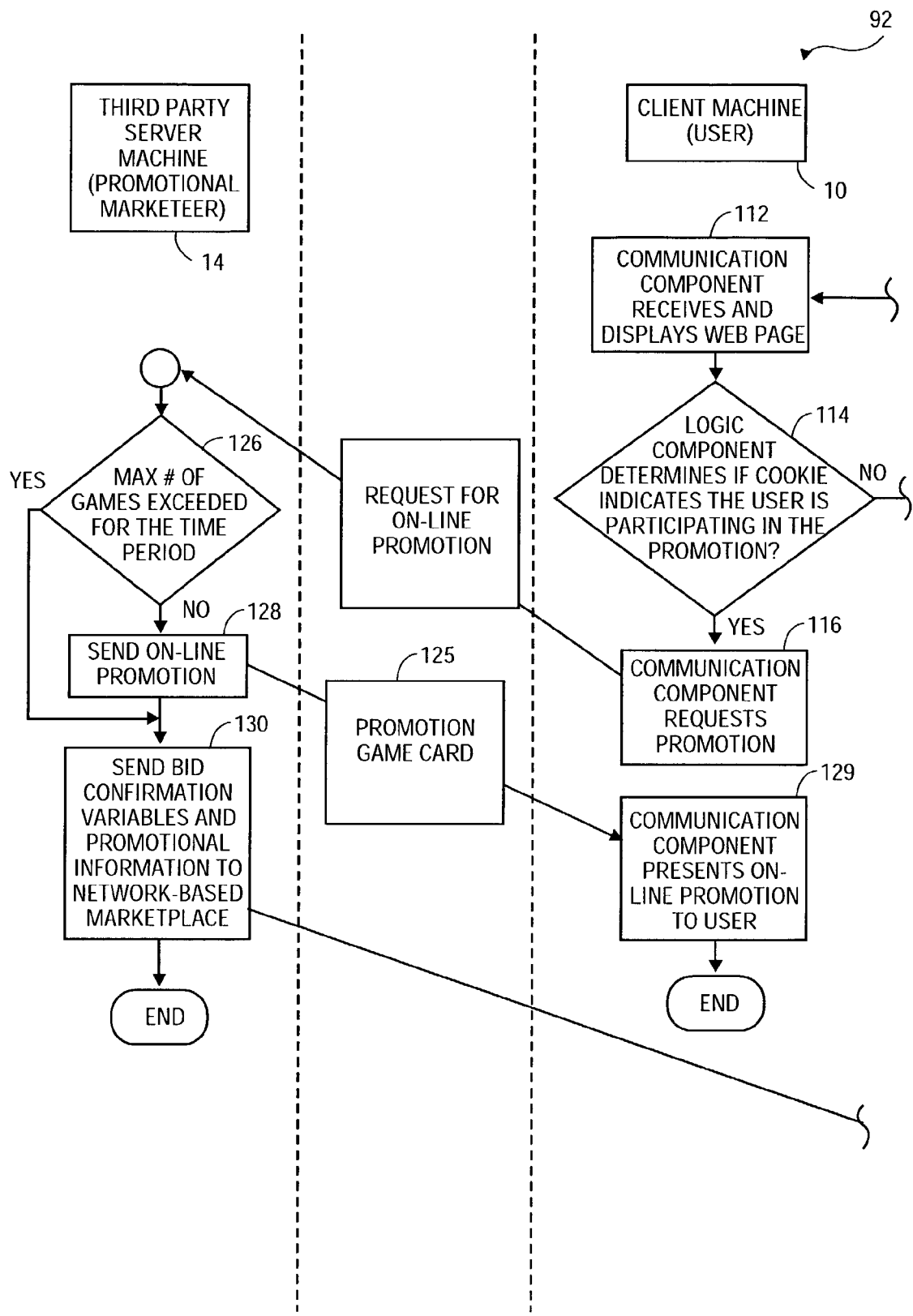
FIG. 14 is an interactive flow chart partially illustrating the method, according to an exemplary embodiment of the present invention, to facilitate an online promotion relating to a network-based marketplace.
Figure 14:
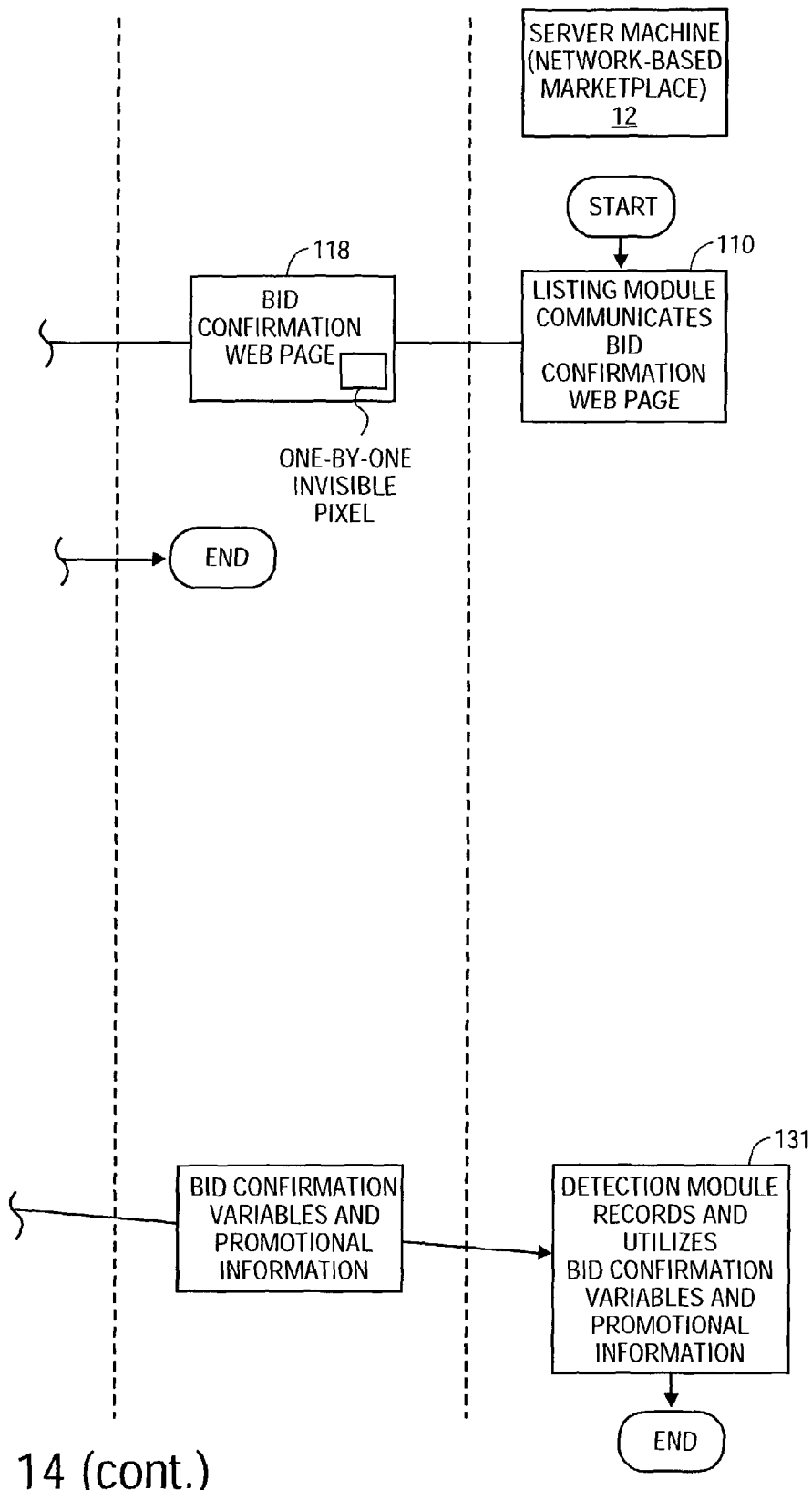

FIG. 14 is an interactive flow chart further illustrating a method 92, according to an exemplary embodiment of the present invention, to facilitate an online promotion in a network-based marketplace 8. Client and server operations are illustrated.

Figure 10:
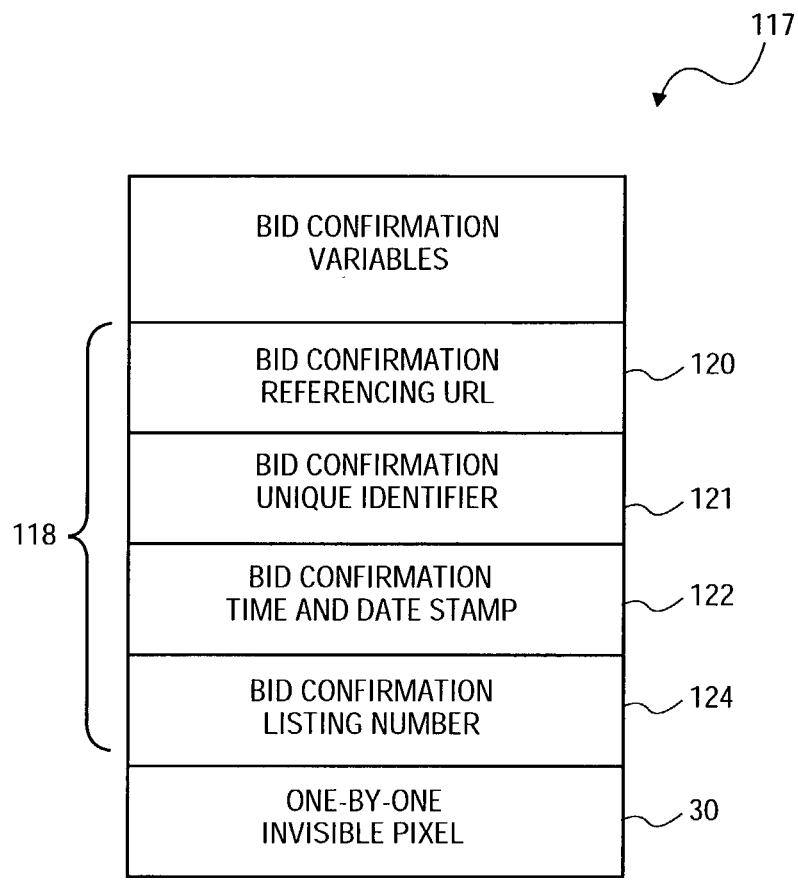
FIG. 10 illustrates an exemplary embodiment of Java script variables embedded in a bid confirmation web page.

At box 110, the listing module 60 communicates a bid confirmation web page 117, an example of which is illustrated in FIG. 25, in response to the user at the client machine 10 performing an exemplary triggering event in the form of submitting a bid. Other embodiments may include communicating a web page in response, for example, to the user entering a listing, making a purchase, updating user profile information or any other activity performed by the user in a network-based marketplace 8. As illustrated in FIG. 10, the bid confirmation web page 117, according to an exemplary embodiment of the present invention, includes exemplary user information in the form of JavaScript that contains bid confirmation variables 118 including a bid confirmation referencing URL 120 that identifies bid confirmation activity that is utilized by the third party service machine 14 to verify that the information received from the client machine 10 indeed originates from a trusted source (e.g., the network-based marketplace machine 12); a bid confirmation unique identifier 121 that is utilized by the third party service machine 14 and the network-based marketplace machine 12 to identify the user associated with the client machine 10; a bid confirmation time and date stamp 122 that is utilized to perform qualification checks (e.g., restricting a number of contest entries within a predetermined time period); a bid confirmation listing number 124 that is utilized to identify the item or service associated with the bid confirmation and the one-by-one invisible pixel 30.

Returning to FIG. 14, at box 112, the communications component 56 at the client machine 10 receives and displays the bid confirmation web page 117. The communications component 56 passes control to the logic component 54 that reads the one-by-one invisible pixel 30 from the HTML CODE of the bid confirmation web page 117. The one-by-one invisible pixel 30 directs the communications component 54 to read the cookie 28 from the storage component 26 and determine if the user has elected to participate in the online promotion. If the user has elected to participate in the online promotion then the logic component 54 invokes the communications component 56 and processing continues at box 116. Otherwise processing ends.

At box 116, the communications component 56 reads the one-by-one invisible pixel 30 which directs the communications component 56 to generate a non-visible pop-up window (e.g., to display the online promotion), to request the online promotion from the third party service machine 14 and to communicate the bid confirmation variables 118 to the third party service machine 14 including the bid confirmation referencing URL 120, the bid confirmation unique identifier 121, the bid confirmation time and date stamp 122, and the bid confirmation listing number 124. In one embodiment, the client machine 10 communicates the bid confirmation variables 118 as URL parameters to the third party service machine 14. In other embodiments the client machine 10 may communicate the bid confirmation variables 118 in a network message.

At decision box 126, the third party service machine 14 utilizes the bid confirmation time and date stamp 122 and the bid confirmation unique identifier 121 to identify if the request for a promotional game will cause the user at the client machine 10 to exceed the maximum number of promotional games in a predetermined period of time. If the user has exceeded the maximum number of promotional games, then the promotional game card 125 is not sent to the user and processing continues at box 130. Otherwise, at box 128, the third party service machine 14 records an additional promotional game played by the user in a database at the third party service machine 14 and communicates the promotion game card 125 to the client machine 10.

At box 129, the communication component 56, at the client machine 10, receives and populates the pop-up screen with the promotion game card 125 thereby enabling the user to view and participate in the online promotion.

At box 130, the third party service machine 14 communicates the bid confirmation variables 118 and promotional information 127 regarding the promotion (e.g., number of games played by the user, number of prizes won by the user, etc.) to the network-based marketplace machine 12.

At box 131, the detection module 62, at the network-based marketplace machine 12, receives the bid confirmation variables 118 and promotional information 127. The detection module 62 utilizes the bid confirmation variables 118 and the promotional information 127 to search the database 66 in the network-based marketplace machine 12 and obtain additional information for the purpose of generating management, demographic, and marketing reports.

An alternate embodiment of the above method may include testing the maximum number of promotional games at the client machine 10 or at the network-based marketplace machine 12. Further, another embodiment of the present invention may present the user at the client machine 10 an opt-out election instead of the opt-in election. In this embodiment, user action is required to not participate in the promotion. Otherwise, the user is automatically prompted to complete a registration form and presented with an online promotion game. FIG. 24 illustrates a user interface screen with an opt-out election box 109, according to an exemplary embodiment of the present invention.

Figure 15:
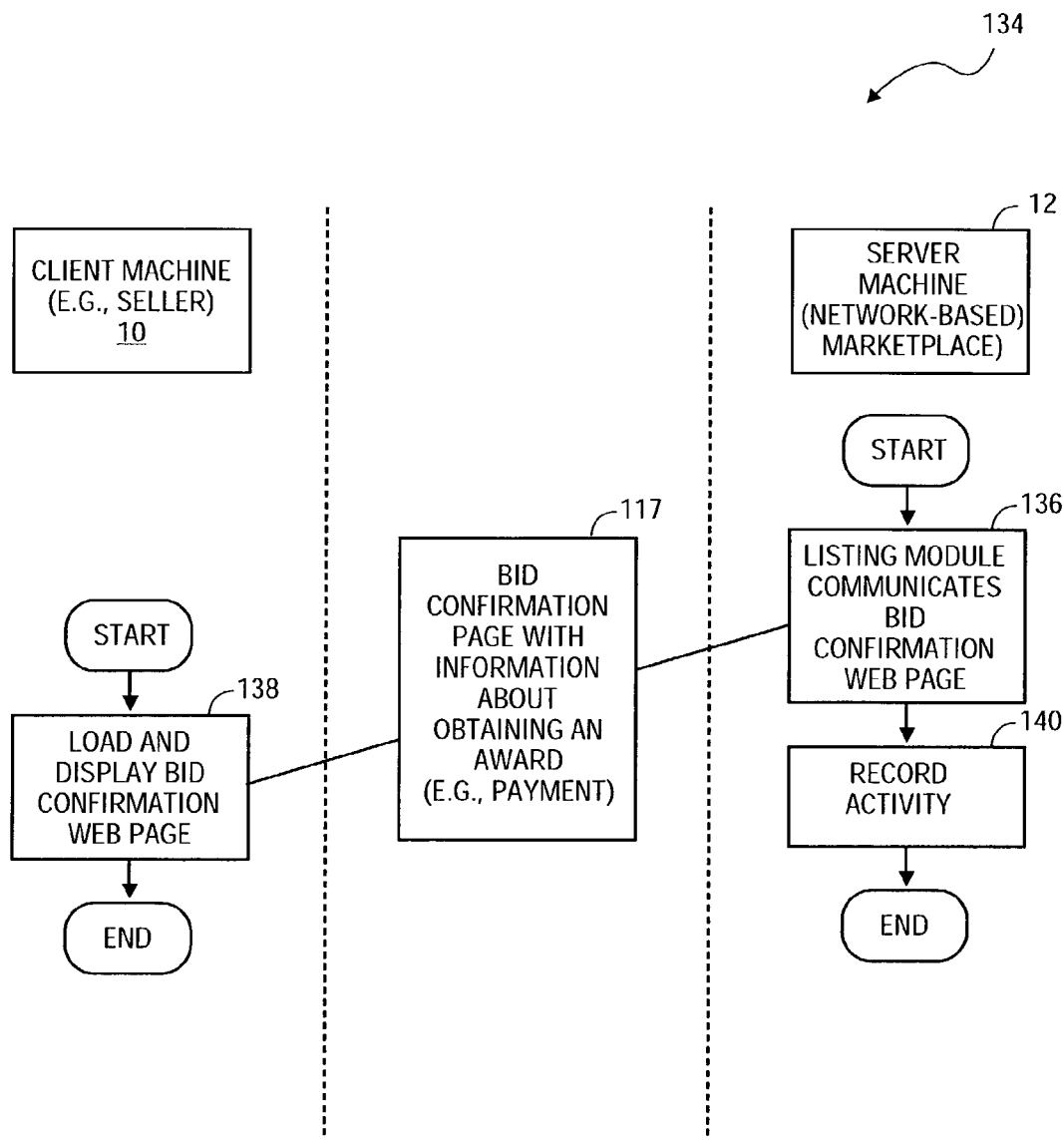
FIG. 15 is an interactive flow chart partially illustrating a method, according to an exemplary embodiment of the present invention, to incentivize a user to perform an activity relating to a network-based marketplace in a timely manner.

Method to Incentivize a Seller to Perform an Activity Relating to a Network-Based Marketplace in a Timely Manner FIG. 15 is an interactive flow chart partially illustrating a method 134, according to an exemplary embodiment of the present invention, to incentivize a user to promptly perform an activity relating to a network-based marketplace in a timely manner. Client and server operations are illustrated.

At box 136, the listing module 60, at the network-based marketplace machine 12, communicates an exemplary user-interface in the form of a bid confirmation web page 117 to the user at the client machine 10. Further, the bid confirmation web page 117 includes JavaScript bid confirmation variables 118, as previously described. In the present example the bid confirmation variables 118 include a reference time that chronicles the moment of bid confirmation in the form of the bid confirmation time and date stamp 122 that is utilized by the network-based marketplace machine 12 to compute an elapsed time.

At box 138, the client machine 10 receives and displays the bid confirmation web page 117 to the user on the client machine 10. FIG. 25 illustrates the bid confirmation web page 117 as viewed by the user at the client machine 10, according to an exemplary embodiment of the present invention. In the present example, the bid confirmation web page 117 informs the user at the client machine 10 that bidding is closed and the user at the client machine 10 is the winner of the auction for a book entitled, "Fun With Ballet for Future Ballerina Dancers." In the present example, the bid confirmation web page 117 informs the buyer that the seller requires payment prior to shipment of the book. To encourage quick payment, the bid confirmation web page 117 informs the user that prompt payment is awarded and that the value of the award may be maximized by making payment in a timely manner.

Returning to FIG. 15, at box 140, bid confirmation activity is recorded at the network-based marketplace machine 12.

Figure 16:
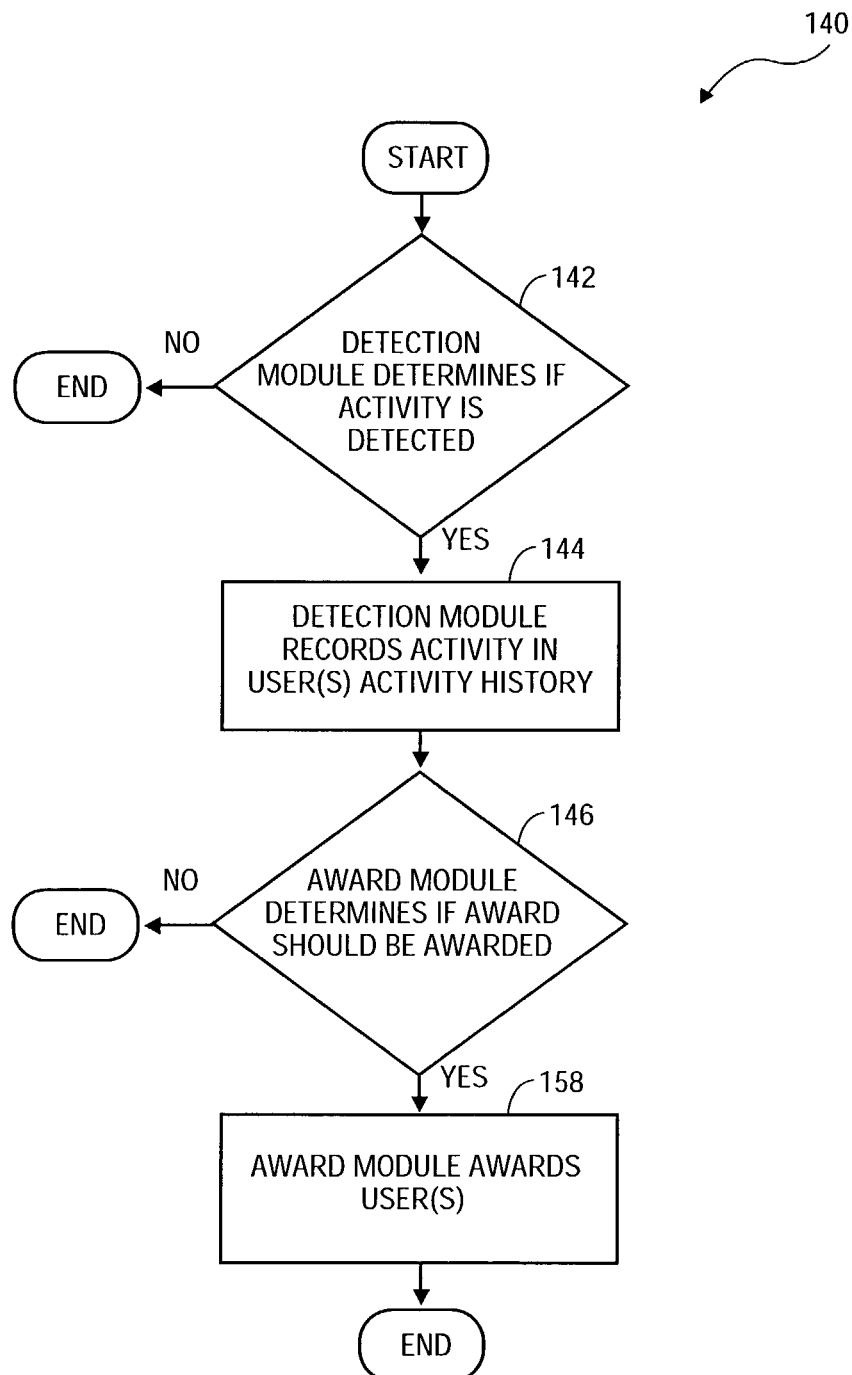
FIG. 16 is a flow chart illustrating an exemplary method to record an activity and determine if an activity should be awarded.

FIG. 16 is a flow chart illustrating the processing executed in box 140.

At decision box 142, the detection module 62 determines if bid confirmation is an activity that should be recorded. The detection module 62 receives the bid confirmation variables 118 and utilizes the bid confirmation referencing URL 120 to search an activity table 89 to a match an activity URL 145 as illustrated in FIG. 9. The activity URL 145 is associated with an activity index 151. Returning to FIG. 16, the detection module 62 compares the bid confirmation referencing URL 120 with the activity URL 145. The detection module 62 branches to box 144 if a match is found. Otherwise the method ends.

Figure 11:
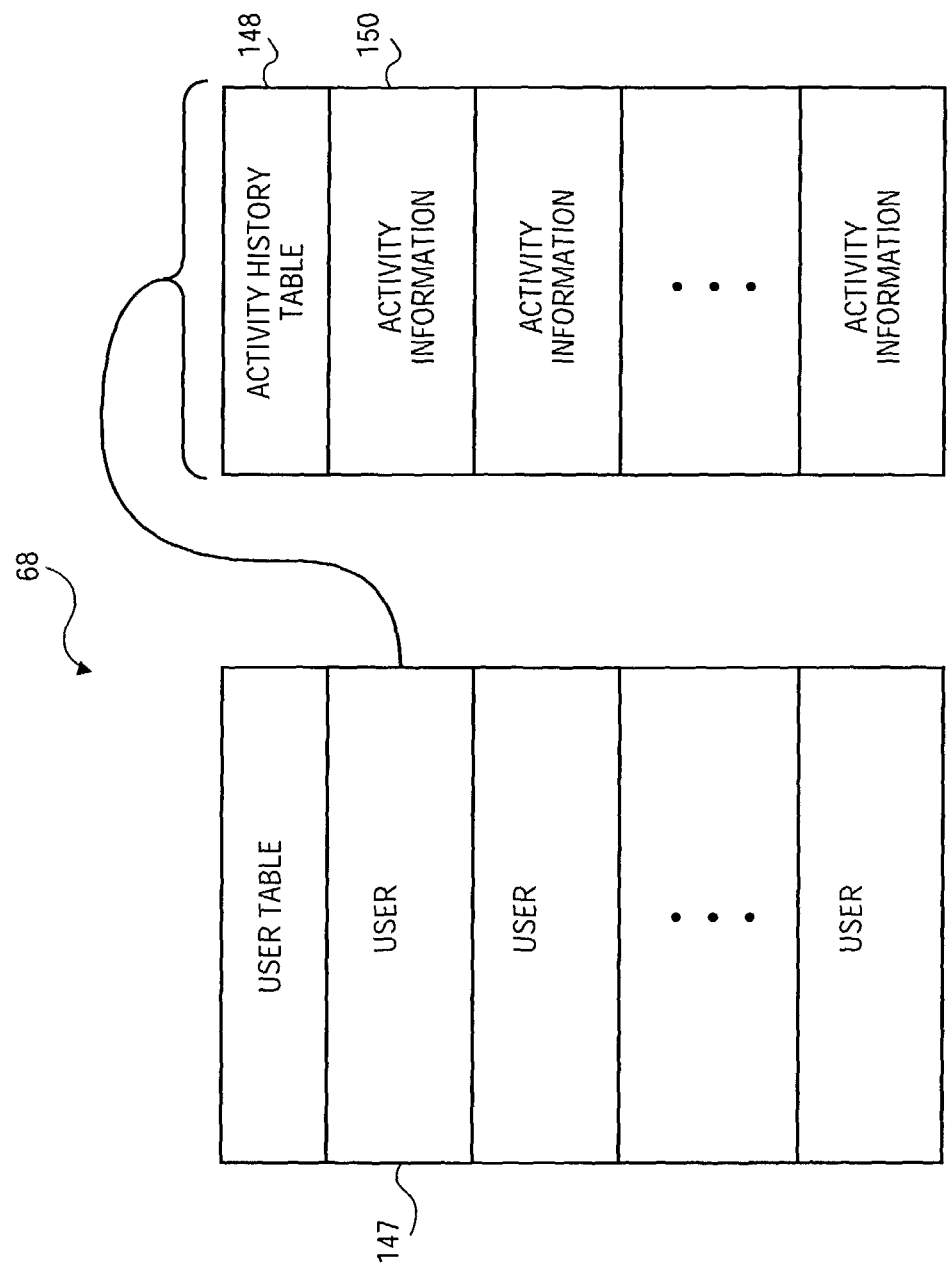
FIG. 11 illustrates an exemplary embodiment of a user table within a database maintained by the exemplary network-based marketplace.

At box 144, the detection module 62 records the activity in one or more entries in the user table 68 as illustrated in FIG. 11. The user table 68 includes a user entry 147 for each user in the system. Each user entry 147 also includes an activity history table 167 that may include multiple entries of activity information 150. Further, a set of index pointers (not illustrated) are maintained such that the most recent activity information 150 is maintained. Thus, the activity information 150 is entered into the activity history table 148 in a round robin fashion where the most recent entry overwrites the oldest entry, presuming the activity history table 148 is full. In the present embodiment the activity information 150 includes the bid confirmation variables 118 and the associated activity index 151; however, it will be appreciated that other embodiments may include additional or different information.

Returning to FIG. 16 and box 144, the detection module 62 utilizes the bid confirmation listing number 124 to identify the appropriate listing entry in the listings table 70 and extract the corresponding user identification index 182 (e.g., entry of the seller). The detection module 62 utilizes the user identification index 182 to write the bid confirmation variables 118 into the activity information 150 entry in the activity history table 148 associated with the seller. Further, the detection module 62 utilizes the bid confirmation unique identifier 121 to write the bid confirmation variables 118 into the activity history table 148 associated with the buyer. Finally, the detection module 62 invokes the award module 64 for the buyer and the seller.

It will be appreciated that for other activity the detection module 62 may update the activity history table 148 for a single user. For example, a seller creating a listing for an item or service would cause the detection module 62 to update activity information 150 only for the seller and not a buyer (e.g., no buyer yet).

At decision box 146, the award module 64 determines if an award should be awarded based on activity information 150 in the respective activity history table 148 for which it was invoked. In the present example the bid confirmation is the most recent activity entered into the activity history table 148. Thus the logic for bid confirmation is utilized to analyze the other entries in the table (e.g., activity that has chronologically preceded the bid confirmation). In the present example, no other activity has preceded the bid confirmation, therefore the award module 64 ends. Processing within decision box 158 is discussed in greater detail upon the detection of a second activity.

Figure 17:
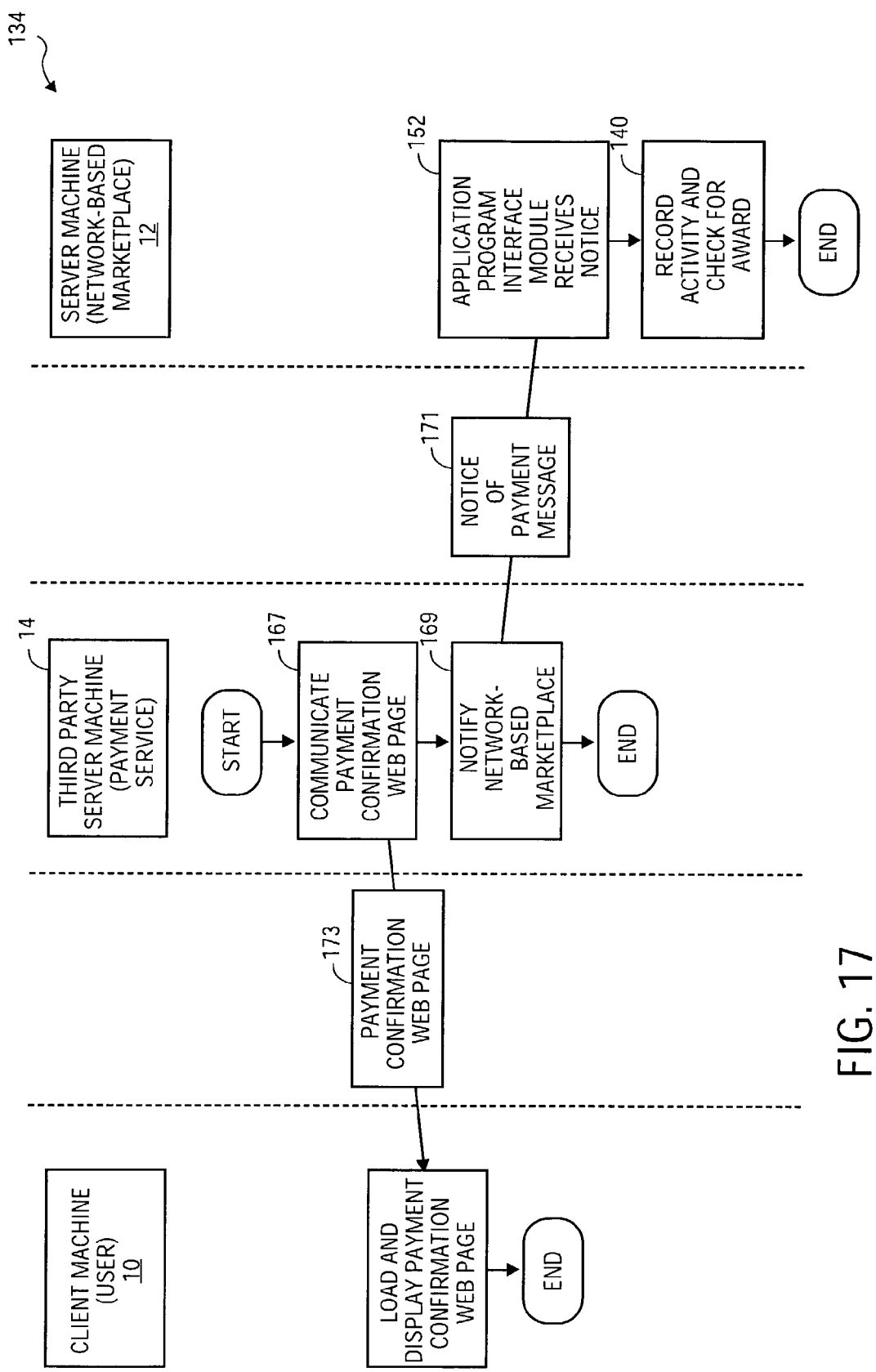
FIG. 17 is an interactive flow chart partially illustrating the method, according to an exemplary embodiment of the present invention, to incentivize a user to perform an activity relating to a network-based marketplace in a timely manner.

FIG. 17 is an interactive flow chart partially illustrating the method 134, according to an exemplary embodiment of the present invention, to incentivize a user to promptly perform an activity related to a network-based marketplace. Processing of two servers and a client are illustrated.

At box 167, the third party service machine 14 communicates a payment confirmation web page 149, as illustrated in FIG. 26, to the client machine 10. The payment confirmation web page 149 is received at the client machine 10 in response to the user utilizing the third party service machine 14 to pay for an item or service that was listed on the network-based marketplace machine 12. Merely for example, the third party service machine 14 may deploy a service embodied in the form of the PayPal online payment service, provided by Ebay Corporation of San Jose, Calif. The PayPal service enables a business or consumer with an email address to send and receive payments online.

Figure 12:
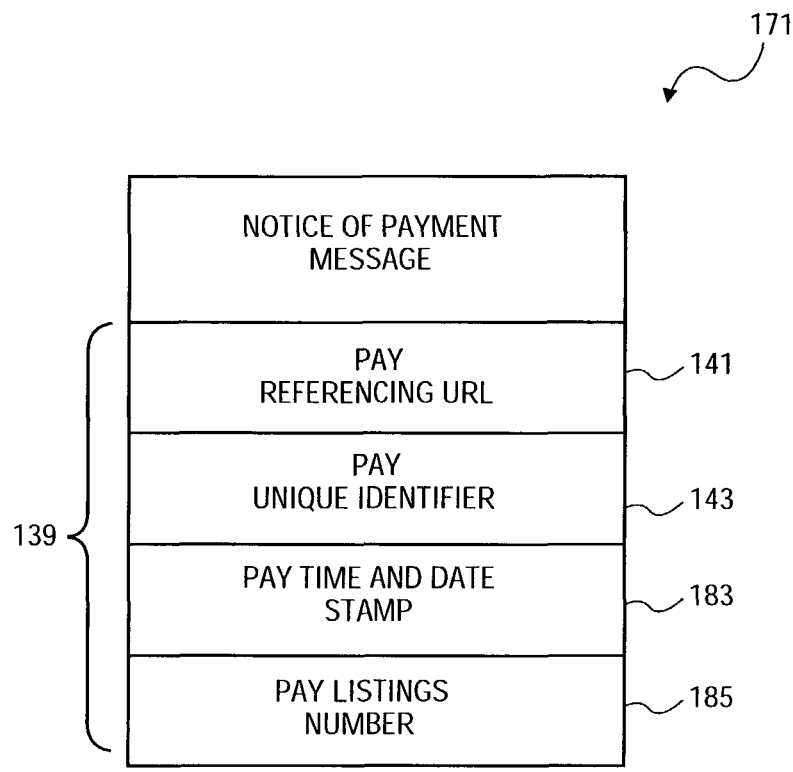
FIG. 12 illustrates an exemplary notice of payment message.

Returning to FIG. 17 at box 169, the third party service machine 14 communicates a notice of payment message 171 to the network-based marketplace machine 12. The notice of payment message 171 includes a set of payment confirmation variables 173 obtained from JavaScript variables that are included in the payment confirmation web page 149. FIG. 12 illustrates the payment confirmation variables 173 including a pay referencing URL 141 that identifies the payment confirmation web page 149 and is utilized by the network-based marketplace machine 12 to identify payment confirmation as an activity; a pay unique identifier 143 that is utilized by the network-based marketplace machine 12 to identify the user at the client machine 10; an exemplary reference time that chronicles the moment of payment confirmation in the form of a pay time and date stamp 183 and is utilized by the network-based marketplace machine 12 to compute an exemplary elapsed time; and a pay listing number 185 that is utilized by the network-based marketplace machine 12 to identify the listing associated with the payment confirmation.

Returning to FIG. 17 at box 152, an application program interface module 58 receives the notice of payment message 171, extracts the payment confirmation variables 173 and invokes the detection module 62.

At box 140, the payment confirmation activity is recorded and a determination is made regarding whether to award the user.

Returning to FIG. 16, at decision box 142 the detection module 62 determines if payment confirmation is an activity that should be recorded. The detection module 62 receives the notice of payment message 171 including the payment confirmation variables 173. The detection module 62 utilizes the pay referencing URL 141 to search the activity table 89 and to match the corresponding activity URL 145, thereby identifying payment confirmation as the activity to be recorded.

At box 144, the detection module 62 records the payment confirmation activity in the buyer and seller activity history tables 148 in the user table 68. In the present embodiment the activity information 150 in the activity history table 148 and is updated with the payment confirmation variables 173 included in the notice of payment message 171 and the associated activity index 151; however, other embodiments may include additional or different information. Finally, the detection module 62 invokes the award module 64 for the activity history table 148 associated with the buyer and the activity history table 148 associated with the seller.

At decision box 146 the award module 64 determines if an award should be awarded. In the present example the payment confirmation activity is the most recent entry in the activity history table 148. Thus the logic for the payment confirmation is utilized to analyze the other activity entries in the table (e.g., activity that has preceded the payment confirmation) to determine if an award should be awarded. It will be appreciated that each activity has unique logic to determine if an award should be awarded. In the present example, the logic executed upon detecting payment confirmation causes the award module 64 to search the activity history table 148 associated with the buyer for corresponding bid confirmation activity (e.g., the same listing number, the same unique identifier, etc.). Upon detecting corresponding bid confirmation activity the award module 64 computes an exemplary elapsed time by subtracting the bid confirmation time and date stamp 122 associated with the bid confirmation activity from the pay time and date stamp 183 associated with the payment confirmation activity. For example, the award module 64 may compute elapsed time in seconds, minutes, hours, days or any standard unit of time. Next, the award module 64 determines the award based on the elapsed time by utilizing an award table 90. FIG. 9 is a block diagram illustrating the award table 90, according to an exemplary embodiment of the present invention. The award table 90 is a two dimensional array indexed by the activity index 151. The activity index 151 for the first activity is used by the award module 64 to identify a first activity column 153 in the award table 90. The activity index 151 for the second activity is used by the award module 64 to identify a second activity row 155 in the award table 90. Each intersected first activity column 153 and second activity row 155 represents a first and second activity combination that is associated with a set of elapsed times 154 that correspond to a set of award values 156. In the present example, the set of elapsed times 154 (e.g., 0, 1 and 2 days) corresponds to award values 156 (e.g., 2, 1 and 0 online promotions). Thus, the award table 90, in the present example, is configured to award fewer online promotions in proportion to an increase in elapsed time (e.g., 2 virtual scratch card games are delivered to a user that submits payment on the same day of bid confirmation).

It will be appreciated that a set of elapsed times 154 and award values 156 may be configured for any combination of network-based marketplace activities including a first activity and second activity with the same activity index 151.

Returning to FIG. 16 and decision box 146, the award module 64 utilizes the award table 90 as described above to determine if the user has indeed won an award and also the value or quantity of the award.

At box 158, the award module 64 awards the user for promptly performing an activity. In the present example, the award value 156 corresponds to a quantity of online promotions in the form of virtual scratch card games. In other embodiments the award value may correspond to a discount percentage or a number of free listings or a percentage reduction in fees or any other benefit that may provide an incentive to the user.

The present embodiment illustrates a buyer that performs a first activity (e.g., a bid confirmation) and is awarded for promptly performing a second activity (e.g., submitting payment using a third party service). In another embodiment, the buyer may be awarded for using a third party service for payment; however, receiving an award could additionally require the buyer to utilize a bank account as a source of payment rather than a credit card account.

Further, it will be appreciated that first and second activities might be any two activities performed by any user in the network-based marketplace. For example, a buyer that purchases a first item may be awarded for promptly purchasing a second item (e.g., from the same or different seller; from the same or different category; utilizing the same or different purchasing method including auctions, purchasing, etc.). In another example, a seller might list a first item and be awarded for promptly listing a second item (in the same or different category; for approximately the same or different prices, etc.). Indeed any first user activity that is performed in a network-based marketplace might be rewarded for timely performing any second user activity that is performed in a network-based marketplace including a second activity that is the same type as the first.

It will also be appreciated that in other embodiments both the buyer and the seller may be awarded. Further, other embodiments may award the buyer and the seller for an activity performed by the seller and an activity performed by the buyer. Thus, the buyer and the seller are awarded for cooperating to complete the first activity and the second activity in a timely manner.

Figure 18:
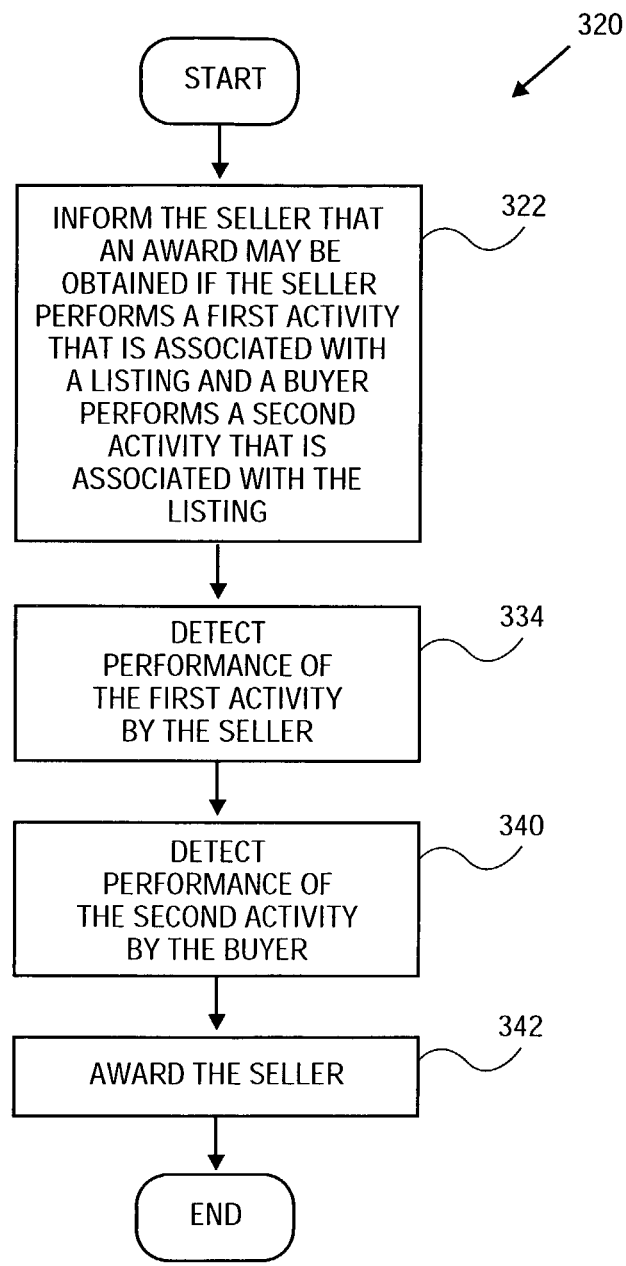
FIG. 18 is a flow chart illustrating a method, according to an exemplary embodiment of the present invention, to incentivize a seller to perform an activity relating to a network-based marketplace.
Figure 29:
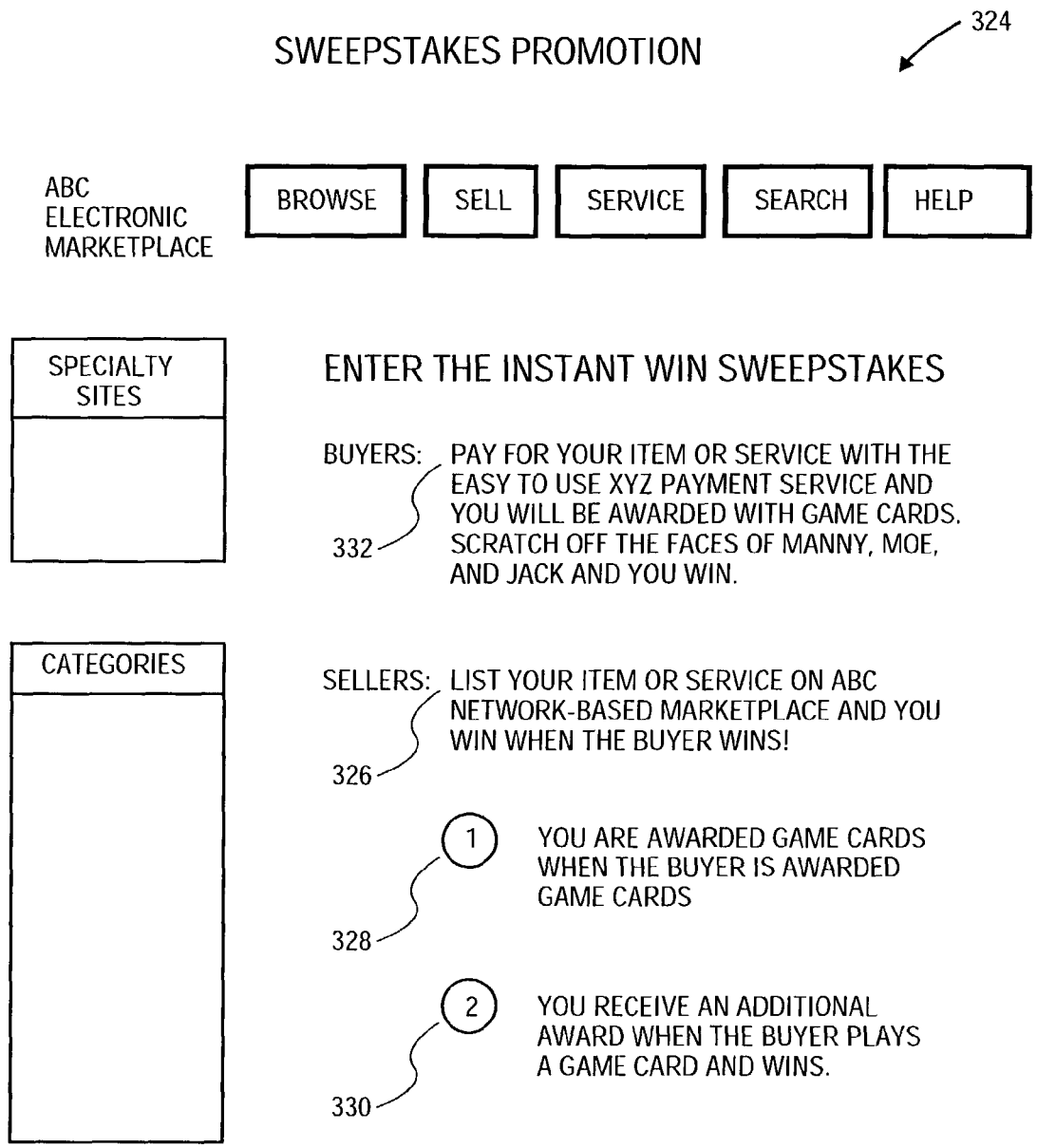

Method to Incentivize a Seller to Perform an Activity Relating to a Network-Based Marketplace Seller Enters Listing FIG. 18 is a flow chart illustrating a method 320, according to an exemplary embodiment of the present invention, to incentivize a seller to perform an activity relating to a network-based marketplace. At box 322, a listing module 60 on the network-based marketplace machine 12 informs a seller at client machine 10 that an award may be obtained. The listing module 60 informs the seller by communicating a user interface screen in the exemplary form of a sweepstakes promotion screen 324, as illustrated in FIG. 29. Specifically, the seller is informed, via a text 326, that by performing a first activity, in the exemplary form of entering a listing for an item or service on the ABC Network-based Marketplace, that a first activity award may be received when the buyer of the listed item or service wins an award in an Instant Win Instant Sweepstakes. Specifically, the seller is informed, via a text 328, that they will win a first activity award in the exemplary form of promotion game cards 125 when the buyer is awarded promotion game cards 125. FIG. 23 illustrates the promotion game card 125 in the form of a virtual scratch card game whereby the seller and/or buyer may win a prize by scratching out the squares covering the faces of Manny, Moe and Jack. Returning to FIG. 29, the seller is further informed, via a text 330, that the seller may win a first activity award if the buyer plays the promotion game card 125 and wins. The seller may win the first activity award in the exemplary form of sharing in the proceeds awarded to the buyer or by receiving an award independent of the proceeds of the buyer. Nevertheless, the text 328 and the text 330 indicate that the seller receives an award when the buyer receives an award.

The seller is further informed, via a text 332, of the activity that must be performed by the buyer to qualify the buyer to receive an award in the form of promotion game cards 125. The buyer may receive an award by paying for the item or service with the "XYZ Payment Service" as described by a text 332. It will be appreciated that other activities related to a network-based marketplace may also result in awarding the buyer the promotion game cards 125 (e.g., submitting the winning bid, paying for the item or service by identifying a bank account as a source of payment, etc.).

Figure 30:
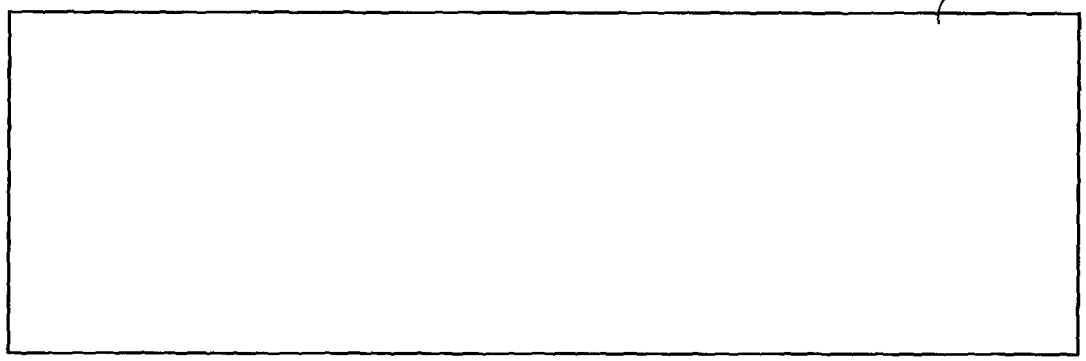

Returning to FIG. 18, at box 334, the seller receives a listing description form 336 that is utilized by the seller to enter a description of an item or a service that is listed on the network-based marketplace machine 12. FIG. 30 illustrates the listing description form 336, according to an exemplary embodiment of the present invention. The listing description form 336 includes a window 338 to enter a listing description. Returning to FIG. 18, the seller at the client machine 10 enters the listing description thus completing the listing description form 336, which is subsequently communicated to the network-based marketplace machine 12.

The listing module 60 at the network-based marketplace machine 12 receives the listing description form 336 and creates a listing description web page 339 that is stored in the listing information field 184 in the listings table 70. FIG. 31 illustrates the listing description web page 339 that describes a Book entitled "Fun with Ballet for Future Ballerina Dancers." Returning to FIG. 18, the listing module 60 writes the listing description webpage 339 to the listings table 70 and invokes the detection module 62.

Figure 8:
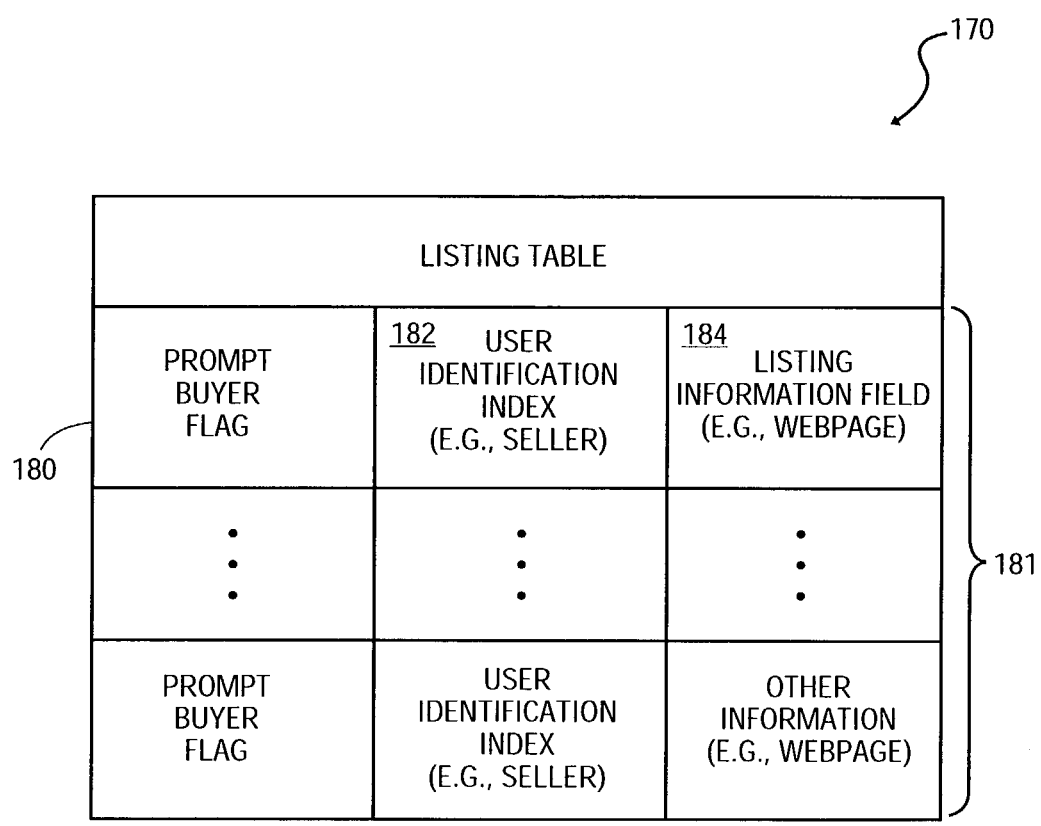
FIG. 8 illustrates an exemplary embodiment of a listing table within a database maintained by the exemplary network-based marketplace.

The detection module 62 updates the listing table 70. FIG. 8 illustrates the listing table 70, according to an exemplary embodiment of the present invention. The listing table 70 includes multiple listing entries that are accessed with a listing index 181. Among other fields, each listing entry includes a prompt buyer flag 180 that is not utilized in the present embodiment and described below. Further, each listing entry includes a user identification index 182 that is utilized to associate the listing entry to the seller that created the listing entry and a listing information field 184 that is utilized to store the listing description form 336, as previously described. Returning to FIG. 18, the detection module 62 ends after updating the user identification index 182.

At box 340, the detection module 62 detects that a buyer has paid for an item or service with the "Easy to use XYZ Payment Service." Further, by utilizing the payment service the buyer has become qualified to win promotion game cards 125. The detection module 62 detects the payment and the qualification to receive promotion game cards 125 by receiving a message from a third party service machine 14 (e.g., a promotional marketeer) that provides online gaming services to the network-based marketplace machine 12. A promotional marketeer interfaces with the network-based marketplace machine 12 to monitor, process and award user activity on the network-based marketplace machine 12. For example, online gaming services may be provided by Maritz® of Fenton, Mo. or Milepoint® of Minneapolis, Minn. or Fairmarket of Woburn, Mass. In an alternate embodiment, the online gaming services may be provided by the network-based marketplace machine 12.

The detection module 62 extracts the listing index 181 included in the message from the third party service machine 14 to access the listing table 70 and extract the user identification index 182 thereby identifying the seller. Finally, the detection module 62 ends after invoking the award module 64 with the user identification index 182.

At box 342, the award module 64 awards the seller for entering the listing on the network-based marketplace machine 12. The award module 64 communicates a message to the third party service machine 14 (e.g. promotional marketeer) that includes the user identification index 182 and triggers the third party service machine 14 to award promotion game cards 125 to the seller identified by the user identification index 182. Other embodiments may award the seller with discounted fees, a free listing, a prize or any other benefit that might provide an incentive to the seller.

In yet another embodiment of the present invention the buyer may perform the second activity by winning proceeds from an online promotion. For example, a promotional marketer may communicate to the network-based marketplace machine 12 that the buyer has been awarded proceeds by scratching off the faces of Manny, Moe and Jack on a virtual scratch card (e.g., promotion game card 125). In this embodiment the associated seller may also receive an award. The seller may receive a percentage of the buyer's proceeds or receive an award in addition to the buyer's proceeds.

In yet another embodiment, the seller may be awarded when the buyer uses a third party service to pay for the service or item and uses a bank account as a source of payment rather than a credit card account.

Seller Elects to Promote

Figure 19:
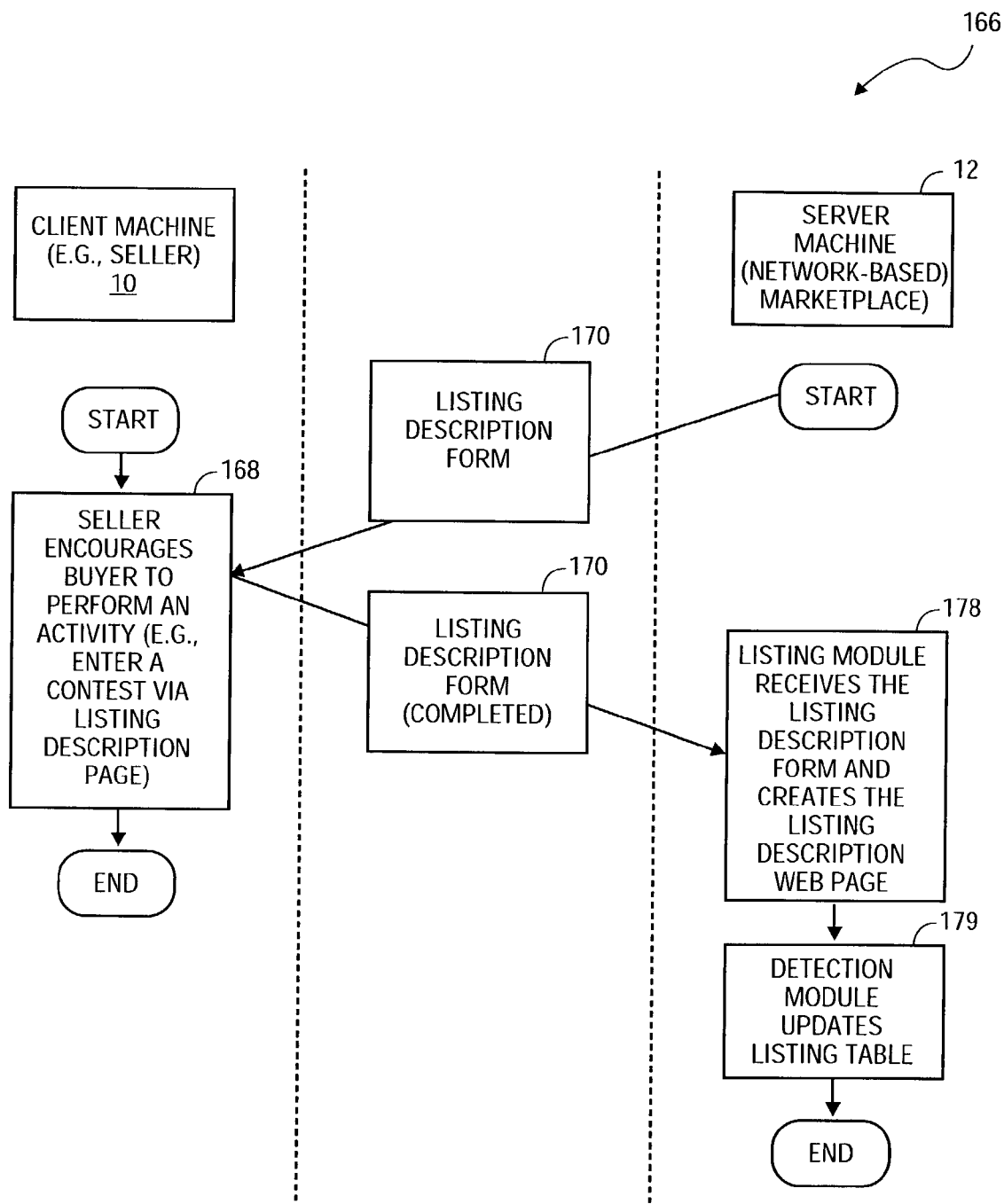
FIG. 19 is an interactive flow chart partially illustrating a method, according to an exemplary embodiment of the present invention, to incentivize a seller to perform an activity relating to a network-based marketplace.

FIG. 19 is an interactive flow chart partially illustrating a method 166, according to an exemplary embodiment of the present invention, to incentivize a seller to perform an activity relating to a network-based marketplace 8. Client and server operations are illustrated.

Figure 27:
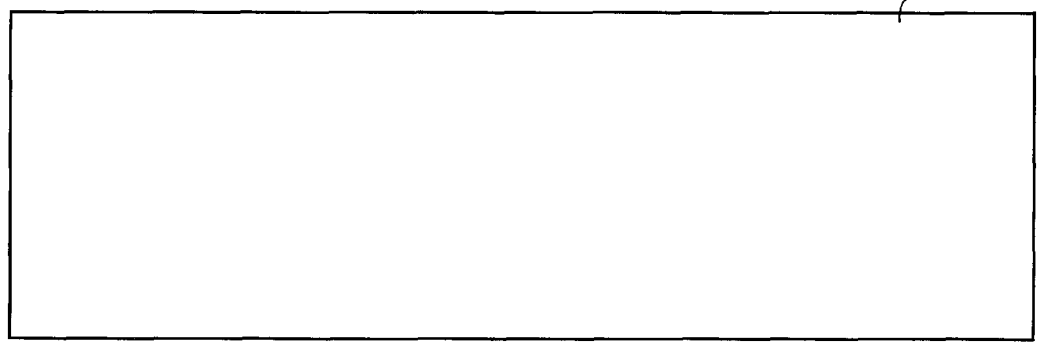

At box 168, the seller receives a listing description form 170 that is utilized by the seller to enter a description of an item or service that is listed on the network-based marketplace machine 12. FIG. 27 illustrates the listing description form 170, according to an exemplary embodiment of the present invention. The listing description form 170 includes a window 172 to enter a listing description; a message 174 informing the seller of an award that may be obtained in the form of the promotion game card 125 for performing a first activity in the exemplary form of prompting a potential buyer to use the XYZ Payment Service to pay for the seller's item; and an election box 176 enabling the seller to elect to encourage the buyer to use the XYZ Payment Service for payment. Returning to FIG. 19 and box 168, the seller at the client machine 10 enters the listing description and elects to encourage the buyer to use the XYZ payment service by marking the election box 176 thus completing the listing description form 170, which is subsequently communicated to the network-based marketplace machine 12.

At box 178, the listing module 60 at the network-based marketplace machine 12 receives the listing description form 170 and creates a listing description web page 186 that is stored in the listing information field 184 in the listings table 70. In the present embodiment, the listing module 60 inserts a text string into the listing description web page 186 upon detecting an affirmative election recorded by user at the client machine 10 in the election box 176. FIG. 28 illustrates the listing description web page 186 that describes a Book entitled "Fun with Ballet for Future Ballerina Dancers" and encourages the potential buyer to "Try the easy use XYZ Payment Service to pay for this item". Other embodiments may encourage to the potential buyer by inserting a graphic, an illustration, a streaming video, an audio recording or any other media form capable of prompting the buyer to perform an activity. Note that the seller has exclusive control over the appearance of the listing, as illustrated by the listing description web page 186, and that encouragement to use the XYZ Payment Service will not appear without the seller's permission. Thus, the network-based marketplace machine 12 enlists the advertising support of the seller by offering an incentive in the form of one or more promotion game cards 125.

Returning to FIG. 19, the listing module 60 writes the listing description web page 186 to the listings table 70 and invokes the detection module 62.

At box 179, the detection module 62 updates the listing table 70. Each listing entry includes a prompt buyer flag 180 that is utilized to record the seller's election as recorded by the election box 176. The detection module 62 ends after copying the election as recorded in the election box 176 into the prompt buyer flag 180 and updating the user identification index 182.

Figure 20:
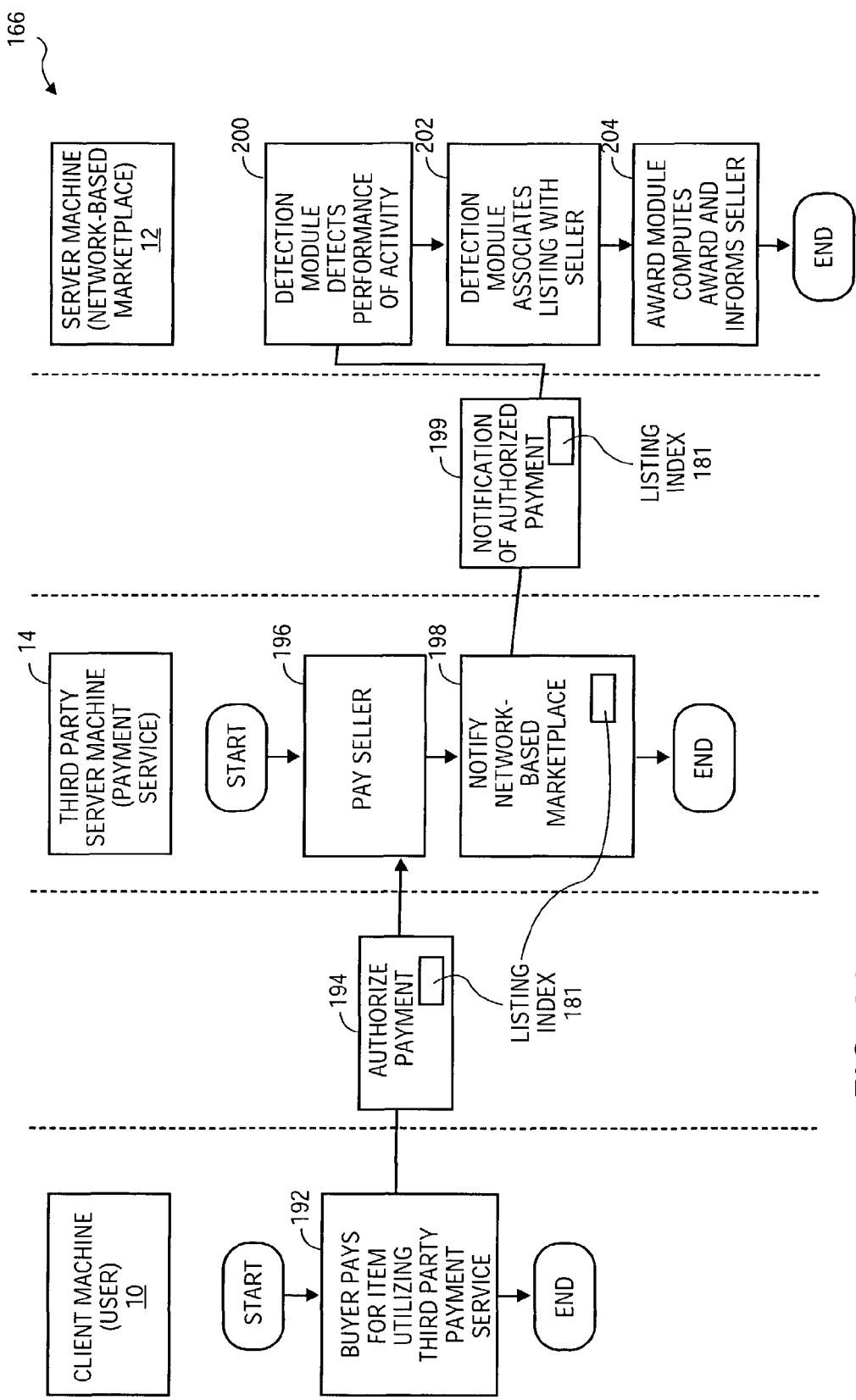
FIG. 20 is an interactive flow chart partially illustrating the method, according to an exemplary embodiment of the present invention, to incentivize a seller to perform an activity relating to a network-based marketplace.

FIG. 20 is an interactive flow chart partially illustrating the method 166, according to an exemplary embodiment of the present invention, to incentivize a seller to perform an activity relating to a network-based marketplace 8. Client and server operations are illustrated.

At box 192, the buyer performs an exemplary second activity by paying for the item or service with a third party service. The buyer may enter the third party service by selecting a third party service button which appears on one of the web pages provided by the network based marketplace machine 12. A buyer that has not previously joined the third party service may do so by utilizing a graphical representation and reference describing how to join the service. Once the buyer has joined the service, the buyer may pay for the item or service by using the third party service machine 14.

The client machine 10 communicates an authorization of payment 194 that includes the listing index 181 and other information, to the third party service machine 14. It will be appreciated that the buyer may acquire the item service from the seller in different ways. In one embodiment the buyer may submit a winning bid in an auction. In another embodiment the buyer may purchase the item from the seller.

At box 196, the third party service machine 14 receives and processes the authorization of payment 194 by debiting the account of the buyer and crediting the account of the seller.

At box 198, the third party service machine 14 communicates a notification of authorized payment 199 to the network-based marketplace machine 12. The notification of authorized payment 199 includes the listing index 181 in addition to other information.

At box 200, the detection module 62 detects the notification of authorization of payment 199 associated with the listing index 181.

At box 202, the detection module 62 associates the notification of authorization of payment 199 with a seller by utilizing the listing index 181 to extract the user identification index 182 of the seller from the listing table 70. Further, the detection module 62 invokes the award module 64 upon identifying an asserted prompt buyer flag 180 in the listing table 70.

At box 204, the award module 64 awards the seller for encouraging the buyer to pay for the item or service with the XYZ Payment Service. In the present example, the seller is awarded the opportunity to win a prize by receiving a promotion game card 125 in the form of a virtual scratch card game as illustrated in FIG. 23. Further, in the present embodiment, the award module 64 delivers the award to the seller by communicating a message to the third party service machine 14 (e.g., promotional marketeer).

In another embodiment the award module 64 may count the number of successful referrals to the third party service made by the seller and award the seller proportionately. For example, the seller may receive three promotion game cards 125 in response to a third buyer using the XYZ Payment Service where each buyer (e.g., first, second and third) has been encouraged by the seller to use the XYZ Payment Service and has used the XYZ Payment Service. Still other embodiments may reward the seller in forms other than the promotion game card 125 (e.g., cash back, fee discounts, free listings, or any benefit which may provide an incentive to the seller).

Other embodiments may award the seller from the network-based marketplace machine 12 (e.g., award the seller with discounted fees, a free listing, or any other benefit that might provide an incentive to the seller).

Figure 21:
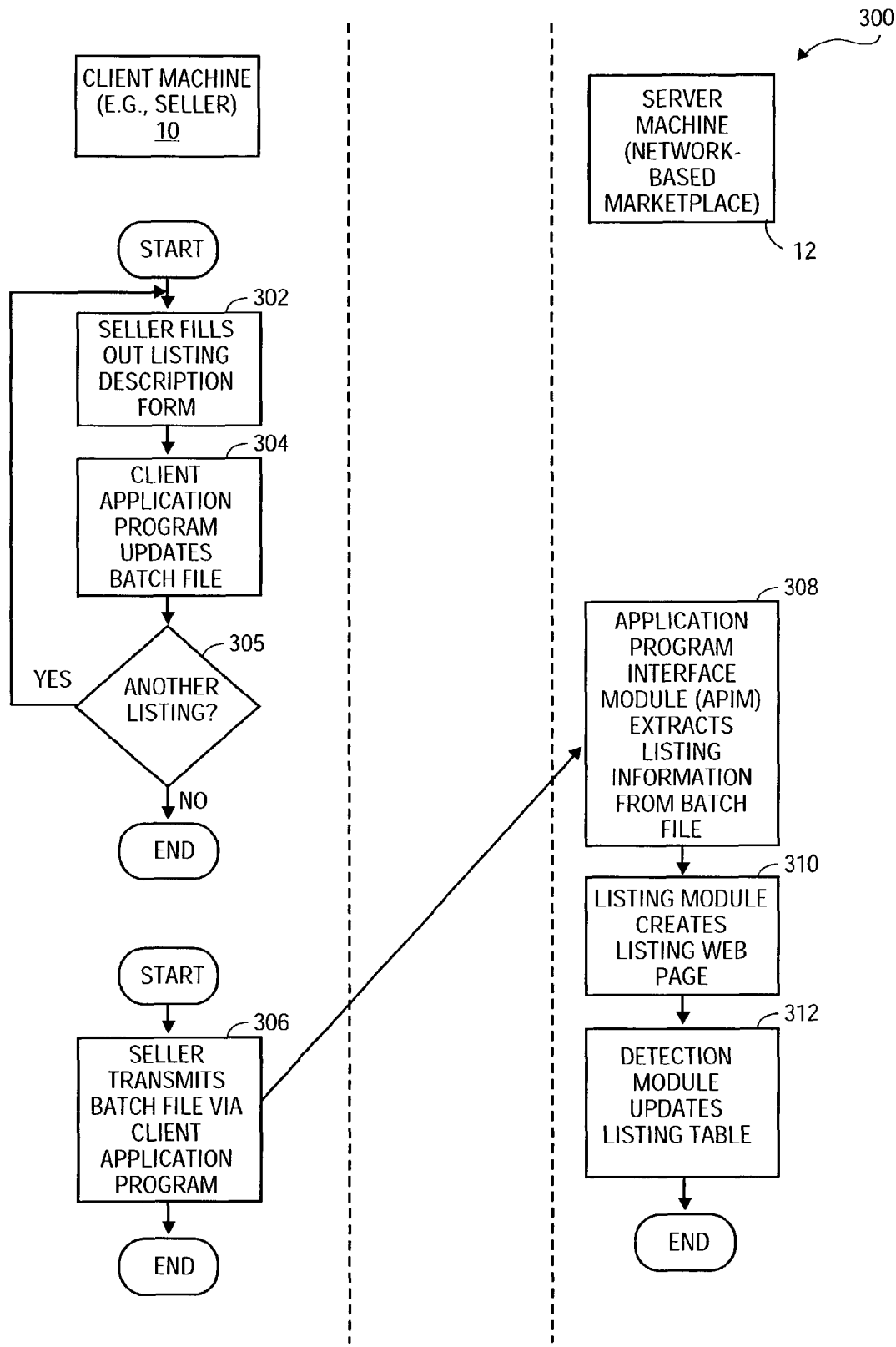
FIG. 21 is an interactive flow chart illustrating a method, according to an exemplary embodiment of the present invention, to collect seller configured incentives relating to a network-based marketplace.

FIG. 21 is an interactive flow chart illustrating a method 300, according to an exemplary embodiment of the present invention, to collect seller configured incentives for a network-based marketplace 10. Client processing is illustrated on the left and server processing is illustrated on the right. The method 300 enables a user to input large quantities of item or service listings and elect to prompt the prospective buyer to perform an activity thus reducing interactions with the network-based marketplace machine 12. The method 300 may be embodied as the client application program 22 executing on the client machine 10 or the mobile client machine 18.

At box 302, the seller inputs an item or service listing description including an election to encourage the potential buyer to perform an activity via the listing description form 170. As previously described the listing description form 170 includes the window 172 to enter a listing description, the message 174 that informs the seller of an opportunity to receive a game card for encouraging a potential buyer to use the XYZ third party payment service and the election box 176 that enables the seller to elect to encourage the buyer to use the XYZ third party payment service.

The client application program 22 receives the listing description form 170 via a communications component 56 and communicates the listing description form 170 to a logic component 54.

At box 304, the logic component 54 of the client application program 22 updates a batch file in a storage component 26 on the client machine 10 with the contents of the listing description form 170 including the contents of the window 172 and the election box 176.

At decision box 305, the logic component 54 of the client application program 22 ends upon determining that the seller does not wish to complete another listing description form 170. Otherwise the logic component 54 branches to box 302.

At box 306, the seller transmits the batch file via the client application program 22. The communications component 56 receives the request to transmit the batch file from the seller and invokes the logic component 54. The logic component 54 reads the batch file from the storage component 26 and communicates the batch file to an application program interface module (APIM) 58 at the network-based marketplace machine 12.

At box 308, on the server side, the APIM 58 receives the batch file, extracts the listing information from the batch file and invokes the listing module 60 for each listing description form 170.

At box 310, the listing module 60 creates a listing description web page 186 for each listing description form 170 and stores the newly created listing description web page 186 in the listings table 70. In the present embodiment, the listing module 60 inserts a text string into the listing description page upon detecting an affirmative election recorded by user at the client machine 10 in the election box 176. FIG. 28 illustrates the listing description web page 186 as previously described. Other embodiments may encourage the potential buyer by inserting a graphic, an illustration, a streaming video, an audio recording or any other media form capable of communicating a message to the potential buyer. Returning to FIG. 21, the listing module 60 writes the newly created listing description web page 186 to the listings table 70 and invokes the detection module 62.

At box 312, the detection module 62 copies the election as recorded in the election box 176 into the prompt buyer field 174 of the listing table 70 and ends.

Figure 32:
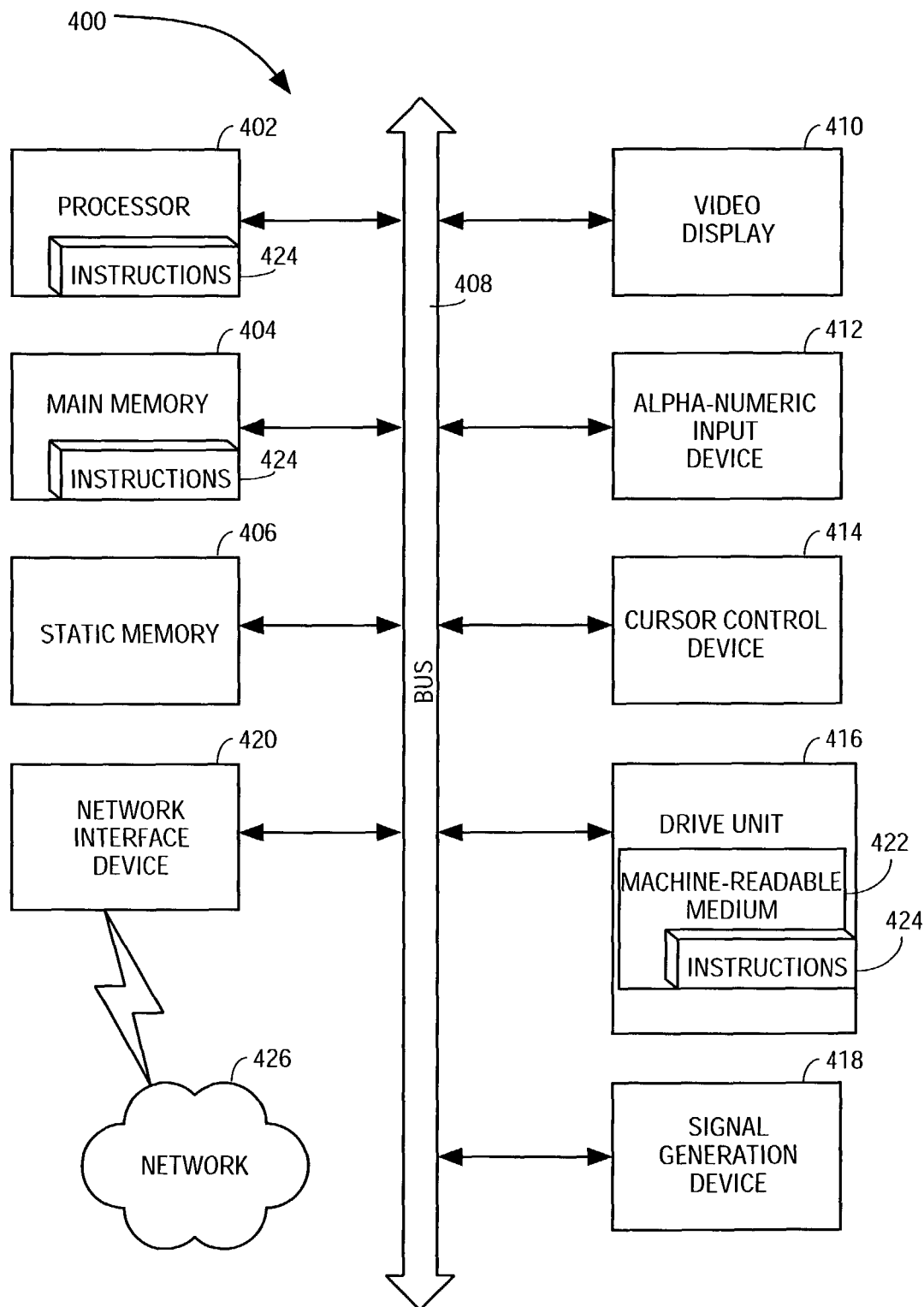
FIG. 32 illustrates a diagrammatic representation of a machine in the exemplary form of a computer system.

FIG. 32 shows a diagrammatic representation of a machine in the exemplary form of a computer system 400 within which a set of instructions, for causing the machine to perform any one or more of the methodologies discussed herein, may be executed. In alternative embodiments, the machine operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alpha-numeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 492 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, methods and systems to facilitate online promotions in a network-bases marketplace have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method to facilitate an online sales promotion in a network-based marketplace, the method including:
    transmitting, by a network-based marketplace machine, a web page to a browser on a client machine, the web page facilitating a user of the client machine to transact products or services identified in listings that are offered for sale by sellers, the web page including a promotion screen element, the online sales promotion to promote an action by the user without advertising a product;
    generating, by the network-based marketplace machine, an opt-in web page for the user, the opt-in web page including directions for the user to follow to participate in the online sales promotion and an opt-in element to receive a user-provided election to opt-in to the online sales promotion;
    communicating, by the network-based marketplace machine in response to the user selecting the promotion screen element, the opt-in web page to the client machine;
    displaying, by the client machine, the opt-in web page to the user in response to the communicating of the opt-in web page by the network-based marketplace machine;
    receiving, by the client machine, the user-provided election from the user to opt-in to the online sales promotion from the opt-in element;
    recording, by the client machine, the user-provided election on the client machine;
    requesting, by the network-based marketplace machine in response to the user entering a listing to a network-based marketplace, a determination of the user-provided election as recorded on the client machine by transmitting a script in a confirmation web page to the client machine, the script being executed by the browser on the client machine to read the recorded contents of the opt-in element and determine that the user elected to participate in the online sales promotion based on the contents;
    communicating, by the client machine in response to the determination that the user elected to participate in the online sales promotion, confirmation details to a service machine, the confirmation details including user information about the user, the service machine to verify whether the confirmation details are appropriate and communicate a promotion game card to the client machine; and
    presenting, by the client machine, the promotion game card of the online sales promotion to the user.

2. The method of claim 1, wherein the user-provided election is recorded within a cookie on the client machine.

3. The method of claim 2, wherein to read the recorded contents of the opt-in element includes reading the cookie as stored on the client machine.

4. The method of claim 3, wherein transmitting the script includes embedding the script in a one-by-one invisible pixel in the confirmation web page.

5. The method of claim 1, wherein the user information includes at least one of a referring universal resource locator, a user identifier, a time and date stamp, and a listing number.

6. The method of claim 5, further including communicating the user information via the service machine to the network-based marketplace.

7. The method of claim 5, wherein the time and date stamp is utilized to limit participation of the user in the online sales promotion.

8. The method of claim 1, wherein the promotion game card is a virtual scratch game card.

9. The method of claim 1, further comprising:
    responsive to communicating the promotion game card to the user, communicating a second promotion game card to a second user; and
    responsive to the user playing the promotion game card and winning a prize, presenting an award to the second user.

10. A system to facilitate an online sales promotion in a network-based marketplace, the system including:
    a network-based marketplace machine including a listing server to:
        transmit a web page to a browser on a client machine, the web page facilitating a user of the client machine to transact products or services identified in listings that are offered for sale by sellers, the web page including a promotion screen element, the online sales promotion to promote an action by the user without advertising a product;
        generate an opt-in web page for the user, the opt-in web page including directions for the user to follow to participate in the online sales promotion and an opt-in element to receive a user-provided election to opt-in to the online sales promotion;
        communicate, in response to the user selecting the promotion screen element, the opt-in web page to the client machine; and
        request, in response to the user entering a listing to a network-based marketplace, a determination of a user-provided election recorded on the client machine by transmitting a script in a confirmation web page to the client machine; and
    the client machine including:
        a communications component to:
            display the opt-in web page to the user in response to the communication of the opt-in web page by the network-based marketplace machine;
            receive the user-provided election from the user to opt-in to the online sales promotion from the opt-in element;
            execute the script transmitted in the confirmation web page to read recorded contents of the opt-in element and determine that the user elected to participate in the online sales promotion based on the contents;

communicate, in response to the determination that the user elected to participate in the online sales promotion, confirmation details to a service machine, the confirmation details including user information about the user, the service machine to verify whether the confirmation details are appropriate and communicate a promotion game card to the client machine; and present the promotion game card of the online sales promotion to the user; and a logic component to record the user-provided election on the client machine in response to receipt of the user-provided election from the user to opt-in to the online sales promotion from the opt-in element and before execution of the script.

11. The system of claim 10, wherein the user-provided election is recorded within a cookie on the client machine.

12. The system of claim 11, wherein to read the recorded contents of the opt-in element includes the script to read the cookie as stored on the client machine.

13. The system of claim 12, further including the listing server to embed the script in a one-by-one invisible pixel in the confirmation web page.

14. The system of claim 10, wherein the user information includes at least one of a referring universal resource locator, a user identifier, a time and date stamp, and a listing number.

15. The system of claim 14, wherein the network-based marketplace server machine further includes a detection module to receive information from the service machine.

16. The system of claim 14, wherein the detection module is to read the user information that includes the time and date stamp to limit participation of the user in the online sales promotion.

17. The system of claim 10, wherein the promotion game card is a virtual scratch game card.

18. The system of claim 10, further comprising:

responsive to communicating the promotion game card to the user, the service to communicate a second promotion game card to a second user; and responsive to the user playing the promotion game card and winning a prize, to present an award to the second user.

19. A plurality of non-transitory machine-readable media storing a set of instructions that, when executed by a client machine and a network-based marketplace server machine, cause the client machine and the network-based marketplace server machine to perform operations comprising:

transmitting, by the network-based marketplace machine, a web page to a browser on the client machine, the web page facilitating a user of the client machine to transact products or services identified in listings that are offered for sale by sellers, the web page including a promotion screen element, the online sales promotion to promote an action by the user without advertising a product;

generating, by the network-based marketplace machine, an opt-in web page for the user, the opt-in web page including directions for the user to follow to participate in the online sales promotion and an opt-in element to receive a user-provided election to opt-in to the online sales promotion;

communicating, by the network-based marketplace machine in response to the user selecting the promotion screen element, the opt-in web page to the client machine;

displaying, by the client machine, the opt-in web page to the user in response to the communicating of the opt-in web page by the network-based marketplace machine;

receiving, by the client machine, the user-provided election from the user to opt-in to the online sales promotion from the opt-in element;

recording, by the client machine, the user-provided election on the client machine;

requesting, by the network-based marketplace machine in response to the user entering a listing to a network-based marketplace, a determination of the user-provided election as recorded on the client machine by transmitting a script in a confirmation web page to the client machine, the script being executed by the browser on the client machine to read the recorded contents of the opt-in element and determine that the user elected to participate in the online sales promotion based on the contents;

communicating, by the client machine in response to the determination that the user elected to participate in the online sales promotion, confirmation details to a service machine, the confirmation details including user information about the user, the service machine to verify whether the confirmation details are appropriate and communicate a promotion game card to the client machine; and presenting, by the client machine, the promotion game card of the online sales promotion to the user.

20. The machine-readable media of claim 19, wherein the user-provided election is recorded within a cookie on the client machine.

21. The machine-readable media of claim 20, wherein to read the recorded contents of the opt-in element includes reading the cookie as stored on the client machine.

22. The machine-readable media of claim 21, wherein transmitting the script includes embedding the script in a one-by-one invisible pixel in the confirmation web page.

23. The machine-readable media of claim 19, wherein the user information includes at least one of a referring universal resource locator, a user identifier, a time and date stamp, and a listing number.

24. The machine-readable media of claim 23, further including communicating the user information via the service to the network-based marketplace.

25. The machine-readable media of claim 23, wherein the time and date stamp is utilized to limit participation of the user in the online sales promotion.

26. The computer-readable media of claim 19, wherein the promotion game card is a virtual scratch game card.

27. The computer-readable media of claim 19, wherein the operations further comprise:

responsive to communicating the promotion game card to the user, communicating a second promotion game card to a second user; and responsive to the user playing the promotion game card and winning a prize, presenting an award to the second user.

* * * * *